United States Patent
Watanabe et al.

(10) Patent No.: US 7,230,524 B2
(45) Date of Patent: Jun. 12, 2007

(54) OBSTACLE DETECTION DEVICE

(75) Inventors: Yutaka Watanabe, Katano (JP); Takashi Yoshida, Ikoma (JP); Akira Ishida, Sakai (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 215 days.

(21) Appl. No.: 10/524,208

(22) PCT Filed: Mar. 9, 2004

(86) PCT No.: PCT/JP2004/003026

§ 371 (c)(1),
(2), (4) Date: Feb. 10, 2005

(87) PCT Pub. No.: WO2004/083889

PCT Pub. Date: Sep. 30, 2004

(65) Prior Publication Data

US 2005/0225439 A1     Oct. 13, 2005

(30) Foreign Application Priority Data

Mar. 20, 2003 (JP) .............................. 2003-078925

(51) Int. Cl.
*B60Q 1/00* (2006.01)

(52) U.S. Cl. ............. 340/435; 340/932.2; 348/148; 342/118; 342/142

(58) Field of Classification Search ................ 340/435, 340/932.2; 701/45–47, 93–98; 348/148; 342/55, 70–72, 118, 119, 142, 144, 146
See application file for complete search history.

(56) References Cited

U.S. PATENT DOCUMENTS

| 4,618,948 | A | * | 10/1986 | Sakakibara et al. ......... 367/104 |
| 6,061,002 | A | * | 5/2000 | Weber et al. ............. 340/932.2 |
| 6,311,119 | B2 | * | 10/2001 | Sawamoto et al. ........... 701/96 |
| 7,126,460 | B2 | * | 10/2006 | Yamada ...................... 340/435 |
| 2002/0044048 | A1 | | 4/2002 | Watanabe et al. |
| 2003/0102965 | A1 | * | 6/2003 | Hemed ....................... 340/435 |

FOREIGN PATENT DOCUMENTS

| EP | 0 782 007 | 7/1997 |
| JP | 7-248382 | 9/1995 |
| JP | 8-048199 | 2/1996 |
| JP | 11-038137 | 2/1999 |

(Continued)

*Primary Examiner*—Jeffery Hofsass
*Assistant Examiner*—Hongmin Fan
(74) *Attorney, Agent, or Firm*—Wenderoth, Lind & Ponack, L.L.P.

(57) ABSTRACT

An obstacle detection device includes: an obstacle detection section (11) for emitting beams having a predetermined divergence angle consecutively in a plurality of different directions, receiving a reflected wave from an obstacle for each direction, and detecting the obstacle existing within an emission angle range of the beam for the direction; a distance calculation section (12) for calculating a distance representative of an interspace between the obstacle and the vehicle for each direction based on a received signal of the reflected wave for the direction outputted from the obstacle detection section; an obstacle image creation section (14) for creating, as an obstacle image, a figure two-dimensionally developed in the emission angle range of the beam emitted in each direction while treating, as a basis for image creation, the distance calculated by the distance calculation section for the direction, and for creating and outputting image data for displaying the obstacle image; and a display section (15) for receiving the image data created by the obstacle image creation section and displaying an image showing a positional relationship between the obstacle and the vehicle.

4 Claims, 37 Drawing Sheets

FOREIGN PATENT DOCUMENTS

| | | |
|---|---|---|
| JP | 2000-187075 | 7/2000 |
| JP | 2000-207697 | 7/2000 |
| JP | 2000-275339 | 10/2000 |
| JP | 2001-334897 | 12/2001 |
| JP | 2002-029349 | 1/2002 |
| JP | 2002-055718 | 2/2002 |
| JP | 2002-120677 | 4/2002 |
| JP | 2002-170103 | 6/2002 |
| JP | 3431678 | 5/2003 |
| JP | 2003-312414 | 11/2003 |
| JP | 2004-025942 | 1/2004 |

\* cited by examiner

OBSTACLE DETECTION DEVICE

TECHNICAL FIELD

The present invention relates to an obstacle detection device, and more specifically to an obstacle detection device to be mounted on a vehicle for detecting and displaying an obstacle in the vicinity of the vehicle.

BACKGROUND ART

In a conventional obstacle detection device (hereinafter referred to as a "first obstacle detection device") a radar that detects an obstacle within a predetermined angular range is used to detect an obstacle behind a vehicle as well as another vehicle on an adjoining traffic lane. If the first obstacle detection device detects an obstacle, it lights an indicator lamp to indicate a direction in which the obstacle has been detected, and displays, in numerals, a distance to the obstacle.

Another obstacle detection device (hereinafter referred to as a "second obstacle detection device") uses a radar to detect an obstacle in the vicinity of the vehicle and displays an image representing the shape of the detected obstacle. The second obstacle detection device stores, as point data, the location of the obstacle as accurately detected by using a laser radar, and draws, based on the stored point data, a line diagram representing the external shape of the obstacle to create a map of the surrounding area of the vehicle.

With the first obstacle detection device, however, it is difficult for a driver to obtain an intuitive grasp of a positional relationship between his or her vehicle and an obstacle, because the location of the obstacle is represented by lighting of a lamp indicating the direction and a numerical value indicating the distance.

Meanwhile, with the second obstacle detection device, which displays a map in which the external shape of a detected obstacle is drawn with a line diagram, a driver can easily grasp a positional relationship between his or her vehicle and the obstacle. However, in order to detect locations of obstacles as points, the second obstacle detection device is equipped with a laser radar whose beam divergence angle is very narrow. As a result, since laser radars are generally costly, the cost of the whole device becomes very high.

Here, the use of a comparatively low-priced, ultrasonic radar or radio-wave radar is conceivable. However, to make the divergence angle of ultrasonic or radio-wave beams narrow, it is necessary to greatly enlarge a horn for emitting ultrasonic waves or an antenna for emitting the radio waves, which causes a problem of a large installation space having to be secured in the vehicle. In other words, regardless of whether the type of beam is laser, sonic, or radio, a problem of cost or installation occurs. Thus, it is not practical to use a radar that emits beams whose divergence angle is very narrow in an obstacle detection device.

Therefore, an object of the present invention is to provide an obstacle detection device that displays a positional relationship between a vehicle and an obstacle such that the driver can easily obtain an intuitive grasp of the positional relationship, even in the case where a radar whose beam divergence angle is comparatively wide is used to detect the obstacle.

SUMMARY OF THE INVENTION

To achieve the above-described object, a first aspect of the present invention is directed to an obstacle detection device to be mounted on a vehicle for detecting and displaying an obstacle in a vicinity of the vehicle, the device including: an obstacle detection section for emitting beams having a predetermined divergence angle consecutively in a plurality of different directions, receiving a reflected wave from an obstacle for each direction, and detecting the obstacle existing within an emission angle range of the beam for the direction; a distance calculation section for calculating a distance representative of an interspace between the obstacle and the vehicle for each direction based on a received signal of the reflected wave for the direction outputted from the obstacle detection section; an obstacle image creation section for creating, as an obstacle image, a figure two-dimensionally developed in the emission angle range of the beam emitted in each direction while treating, as a basis for image creation, the distance calculated by the distance calculation section for the direction, and for creating and outputting image data for displaying the obstacle image; and a display section for receiving the image data created by the obstacle image creation section and displaying an image showing a positional relationship between the obstacle and the vehicle.

Also, within a range of obstacle presence indicated by the received signal of the reflected wave outputted from the obstacle detection section, the distance calculation section calculates an average distance as seen from an emission point of the beam.

Also, the distance calculation section includes a threshold value discriminating section for detecting a portion of the received signal of the reflected wave outputted from the obstacle detection section in which an amplitude thereof exceeds a predetermined threshold value; and a representative distance calculation section for detecting a start time and an end time of the portion of the received signal detected by the threshold value discriminating section, obtaining a length of time that elapses since the beam is emitted until a time obtained by subjecting the detected start time and end time to simple averaging, and calculating a representative distance between the obstacle and the vehicle based on the obtained elapsed time.

Also, within a range of obstacle presence indicated by the received signal of the reflected wave outputted from the obstacle detection section, the distance calculation section calculates a shortest distance as seen from an emission point of the beam.

Also, the distance calculation section includes: a threshold value discriminating section for detecting a portion of the received signal of the reflected wave outputted from the obstacle detection section in which an amplitude thereof exceeds a predetermined threshold value; and a representative distance calculation section for detecting a start time and an end time of the portion of the received signal detected by the threshold value discriminating section, obtaining a length of time that elapses since the beam is emitted until the detected start time, and calculating a representative distance between the obstacle and the vehicle based on the obtained elapsed time.

Also, in the emission angle range of the beam emitted in each direction, the obstacle image creation section creates, as the obstacle image, an arc figure whose center is an emission point of the beam and whose radius is a distance calculated by the distance calculation section for the corresponding direction.

Also, the obstacle image creation section changes thickness of the arc figure as the obstacle image created for each direction, in accordance with the distance calculated by the distance calculation section.

Also, in the emission angle range of the beam emitted in each direction, the obstacle image creation section creates, as the obstacle image, a figure having an area and at least containing an arc figure drawn to have an emission point of the beam for a center and a distance calculated by the distance calculation section for the corresponding direction for a radius.

Also, the obstacle image created by the obstacle image creation section is, exemplarily, an elliptical figure, end points of whose major axis coincide with end points of the arc locus.

Also, the obstacle image creation section, specifically, changes brightness of an entire figure as the obstacle image created for each direction, in accordance with the distance calculated by the distance calculation section.

Also, while treating as a base figure the figure having an area created for each direction, the obstacle image creation section further determines as the obstacle image an entire figure obtained by joining all base figures in order of direction with line segments joining end points on one side of the arc loci contained in base figures in mutually adjacent directions and with line segments joining end points on the other side; and an inside of the entire figure is divided based on the distance from the emission point of the beam, and the image data is created such that brightness of parts obtained by division is gradually changed.

Also, the obstacle image creation section further treats, as a representative location of the obstacle for each direction, a point apart from the emission point of the beam by the distance calculated by the distance calculation section for the direction, the point being in a central direction of the emission angle range of the beam emitted in the direction, and creates image data of a kinked line joining the reference locations in order of direction.

According to the above-described first aspect, based on the direction in which a beam is emitted and a representative distance between a vehicle and an obstacle calculated for each direction, the obstacle detection device creates an image for displaying a relative location of the obstacle in relation to the vehicle, the relative location being detected with an emission point of the beam as a basis. Therefore, it is possible to display the positional relationship between the vehicle and the obstacle in a manner in which the driver can easily recognize. Also, the obstacle image indicating the location of an obstacle is displayed in the form of an angular range in which the beam for each direction is emitted. Therefore, it is possible to display the angular range in which the obstacle exists in a manner which can be easily recognized by the driver.

Another aspect of the present invention is directed to an obstacle detection device to be mounted on a vehicle for detecting and displaying an obstacle in a vicinity of the vehicle, the device including: an obstacle detection section for emitting beams having a predetermined divergence angle consecutively in a plurality of different directions, receiving a reflected wave from an obstacle for each direction, and detecting the obstacle existing within an emission angle of the beam for the direction; a distance calculation section for calculating a distance representative of an interspace between the obstacle and the vehicle for each direction based on a received signal of the reflected wave for the direction outputted from the obstacle detection section; an obstacle data calculation section for calculating a location of the detected obstacle based on the direction in which the beam is emitted and the distance calculated by the distance calculation section; a shape data matching section, in which shape data for representing the shape of an obstacle to be detected is previously inputted, for calculating a location and orientation of the obstacle to be detected in relation to the vehicle by comparing the shape data with obstacle data calculated by the obstacle data calculation section; an obstacle image creation section for creating, based on the shape data of the obstacle to be detected and the location and orientation calculated by the shape data matching section, a target obstacle image in which the location and orientation of the obstacle to be detected is changed, and generating image data for displaying the target obstacle image; and a display section for receiving the image data generated by the obstacle image creation section and displaying an image illustrating a positional relationship between the obstacle and the vehicle.

Also, the obstacle image creation section further creates as a detection obstacle image a figure two-dimensionally developed within an emission angle of the beam for each direction, while treating as a basis for image creation a distance calculated by the distance calculation section for each direction, and generates image data for displaying the obstacle image and outputs it together with image data of a target obstacle image; and the display section receives the image data of the target obstacle image created by the obstacle image creation section and the image data of the detection obstacle image, and displays the target obstacle image and the detection obstacle image so as to be superposed one on the other.

According to the other aspect described above, the obstacle detection device, in which shape data representing the shape of an obstacle to be detected is previously inputted, displays an image representing a relative positional relationship between the obstacle and the vehicle such that it coincides with the location of the obstacle detected by the obstacle detection means. Therefore, the driver can easily grasp the positional relationship between the entire obstacle and the vehicle.

These and other objects, features, aspects and advantages of the present invention will become more apparent from the following detailed description of the present invention when taken in conjunction with the accompanying drawings.

BEST MODE FOR CARRYING OUT THE INVENTION

First Embodiment

Figure 1:
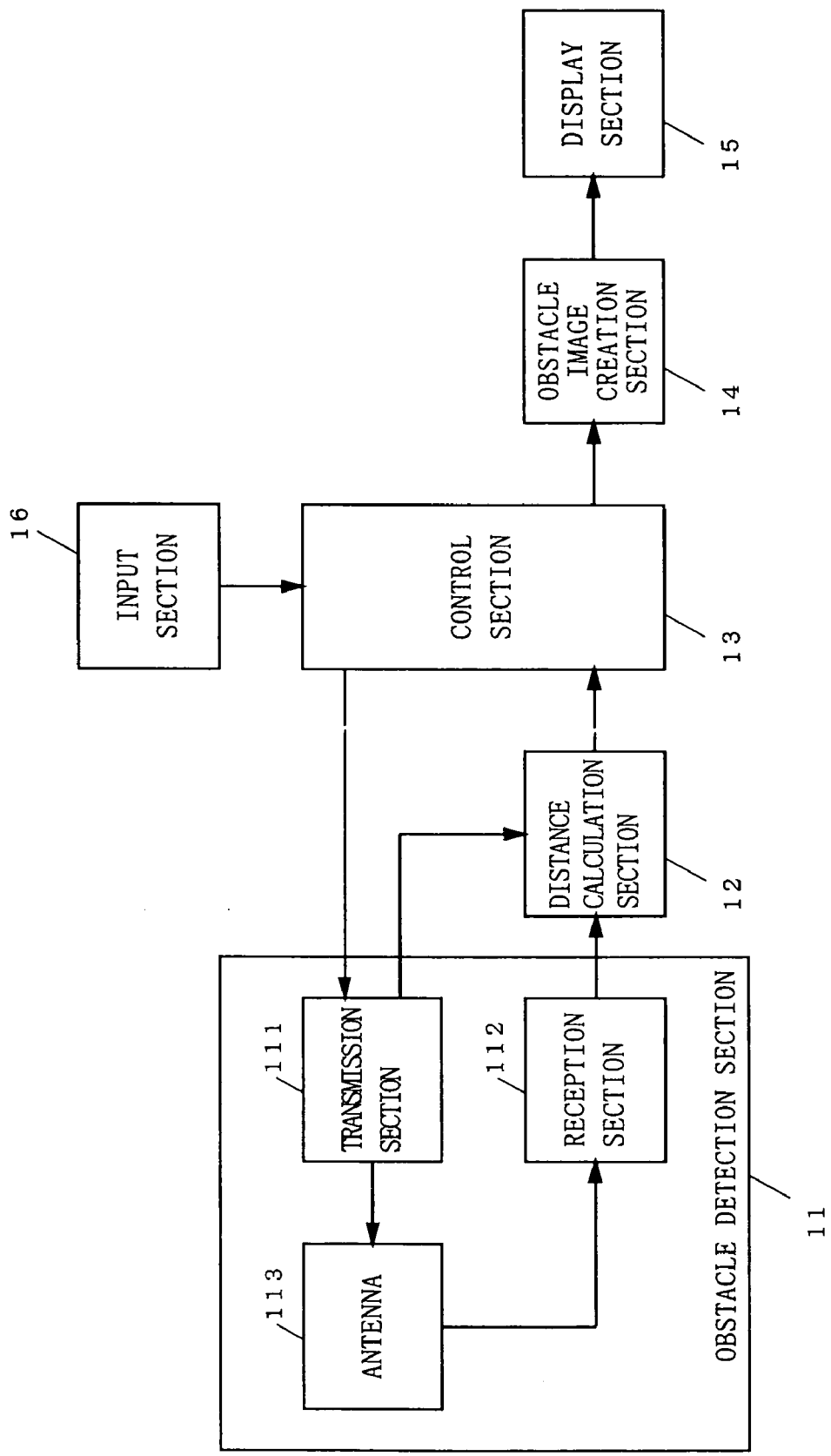
FIG. 1 is a block diagram illustrating a structure of an obstacle detection device according to a first embodiment of the present invention.

FIG. 1 is a block diagram illustrating the structure of an obstacle detection device according to a first embodiment of the present invention. In FIG. 1, the obstacle detection device is typically mounted on a vehicle, and includes an obstacle detection section 11, a distance calculation section 12, a control section 13, an obstacle image creation section 14, a display section 15, and an input section 16.

The obstacle detection section 11 is constituted as a radio-wave radar device which detects an obstacle in the vicinity of a vehicle. Based on the direction in which an obstacle is to be detected, the obstacle detection section 11 is installed at one or more places selected from, for example, the front, sides, and rear of the vehicle. The obstacle detection section 11 emits a beam with a predetermined divergence angle a plurality of times while changing the direction. Every time the obstacle detection section 11 emits a beam, it receives a reflected wave of the beam reflected by the obstacle situated within an irradiation range of the beam. Although the present embodiment assumes that the obstacle detection section 11 is a radio-wave radar, it is not restricted to a radio-wave radar but may be an ultrasonic radar or a laser radar, for example.

The obstacle detection section 11 includes a transmission section 111, a reception section 112, and an antenna 113. The transmission section 111 generates a transmission signal and, in addition to outputting the transmission signal to the antenna 113, outputs a part of the transmission signal to the distance calculation section 12. The antenna 113 emits a beam with a predetermined divergence angle and receives a received signal of the reflected wave of the beam reflected by the obstacle. The reception section 112, which includes an amplifier, a detector, and the like, outputs the received signal received by the antenna 113.

The antenna 113 is, for example, an array antenna. The array antenna, which is composed of a plurality of antenna elements arranged in the same plane and an equal number of phasers for respectively supplying transmission signals to their corresponding antenna elements, controls the amplitude and phase of a signal supplied from each phaser to the corresponding antenna element thereof to emit a beam in a desired direction. Note that the antenna 113 may include separate antenna elements, i.e., those for transmission purpose and those for reception purpose. Alternatively, a duplexer, a circulator, etc. may be used to apply the same antenna element to both transmission and reception.

Figure 2:
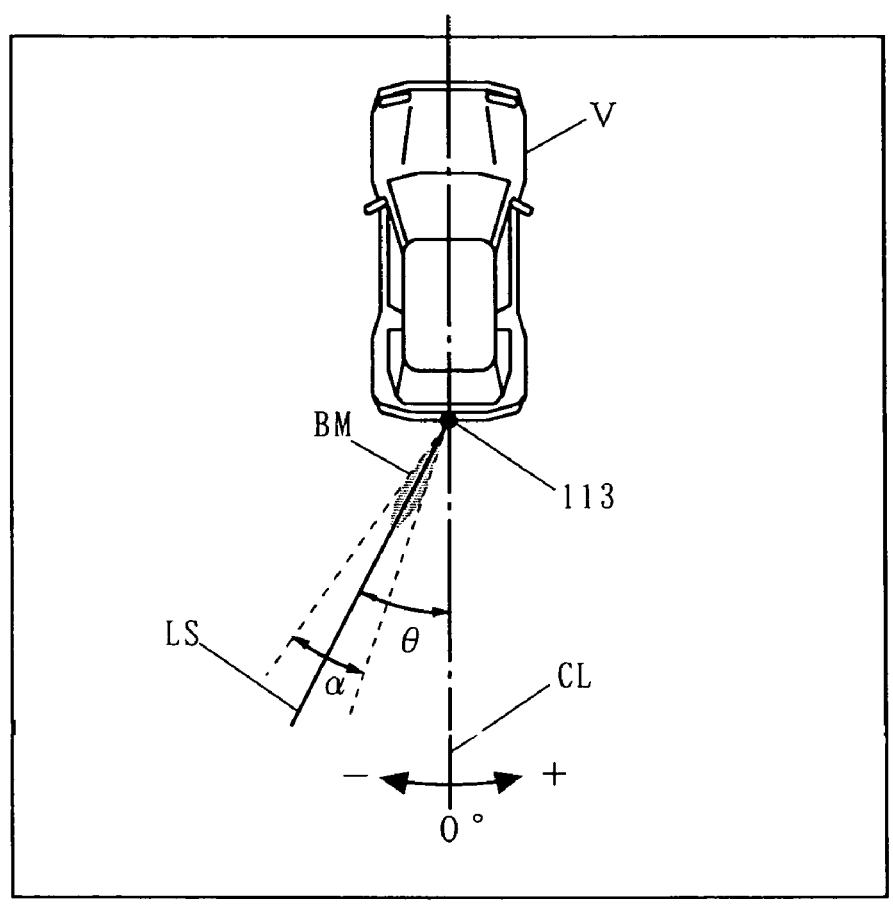
FIG. 2 is a schematic diagram illustrating a beam emitted by the obstacle detection device according to the first embodiment of the present invention.

Next, with reference to FIG. 2, the beam emitted by the obstacle detection section 11 is described more specifically. In FIG. 2, the beam emitted by the obstacle detection section 11 is illustrated. In FIG. 2, the antenna 113 of the obstacle detection section 11 is installed at the center of the rear end of a vehicle V. A beam BM is being emitted from the antenna 113 in the direction indicated by a line segment LS forming a predetermined angle of $\theta$ with a center line CL (see the dot-dash line) of the vehicle. The beam BM is to be emitted within a predetermined angular range of $\alpha$ centered around the line segment LS.

In the present embodiment, a direction in which a beam is emitted is represented by an angle the beam forms with the center line CL of the vehicle as seen from the antenna 113, where it is assumed that the center line CL of the vehicle defines 0°, the left side of the vehicle corresponds to the minus side, and the right side of the vehicle the plus side. For example, the direction indicated by the line segment LS in FIG. 2 is $-\theta$. The obstacle detection section 11 emits a beam BM a plurality of times while changing the direction, thus emitting beams within the predetermined angular range.

Based on the transmission signal outputted from the transmission section 111 and the received signal outputted from the reception section 112, the distance calculation section 12 calculates a distance from the antenna 113 to the obstacle, and outputs it as distance data. The control section 13 outputs, to the transmission section 111, direction data representing a direction in which a beam is to be emitted, and, after the beam is emitted based on the direction data, stores the distance data outputted from the distance calculation section 12 together with the direction data.

The obstacle image creation section 14 creates an obstacle image that at least indicates a location of the detected obstacle, based on the direction data and the distance data stored in the control section 13. The display section 15, which is, for example, a display such as an LCD disposed in a console of the vehicle, displays the obstacle image created by the obstacle image creation section 14. The input section 16, e.g., a selector switch or a keyboard operated by the driver, is used to change the on/off of the obstacle detection device, for example.

Figure 3:
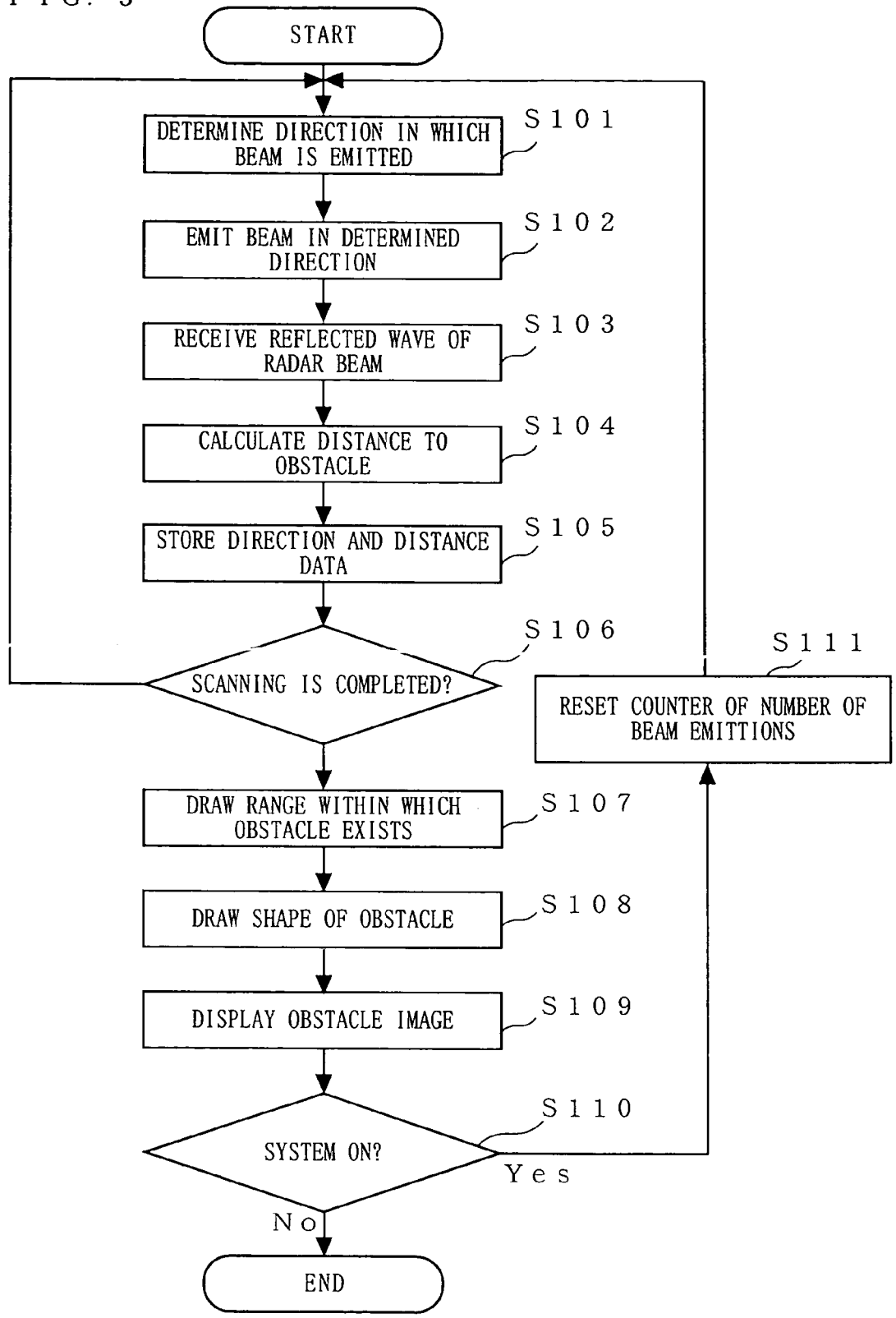
FIG. 3 is a flowchart illustrating an operation of an obstacle detection device according to first through fourth embodiments of the present invention.

Next, with reference to FIG. 3, an operation of the present obstacle detection device is described. FIG. 3 is a flowchart illustrating an operation of the entire present obstacle detection device. Once the present obstacle detection device starts scanning a surrounding area of the vehicle, the control section 13 outputs, to the transmission section 111, direction data representing a direction in which a beam is to be emitted, and also increments a counter indicating the number of times a beam has been emitted (step S101).

Once the direction data is outputted from the control section 13, the transmission section 111 outputs, to the antenna 113, a transmission signal and a direction control signal for emitting a beam in the direction indicated by the direction data, whereby it emits the beam. In addition, the transmission section 111 outputs the transmission signal to the distance calculation section 12 (step S102). The reception section 112 receives the reflected wave of the beam emitted at step S102, and outputs a received signal to the distance calculation section 12 (step S103).

Figure 4:
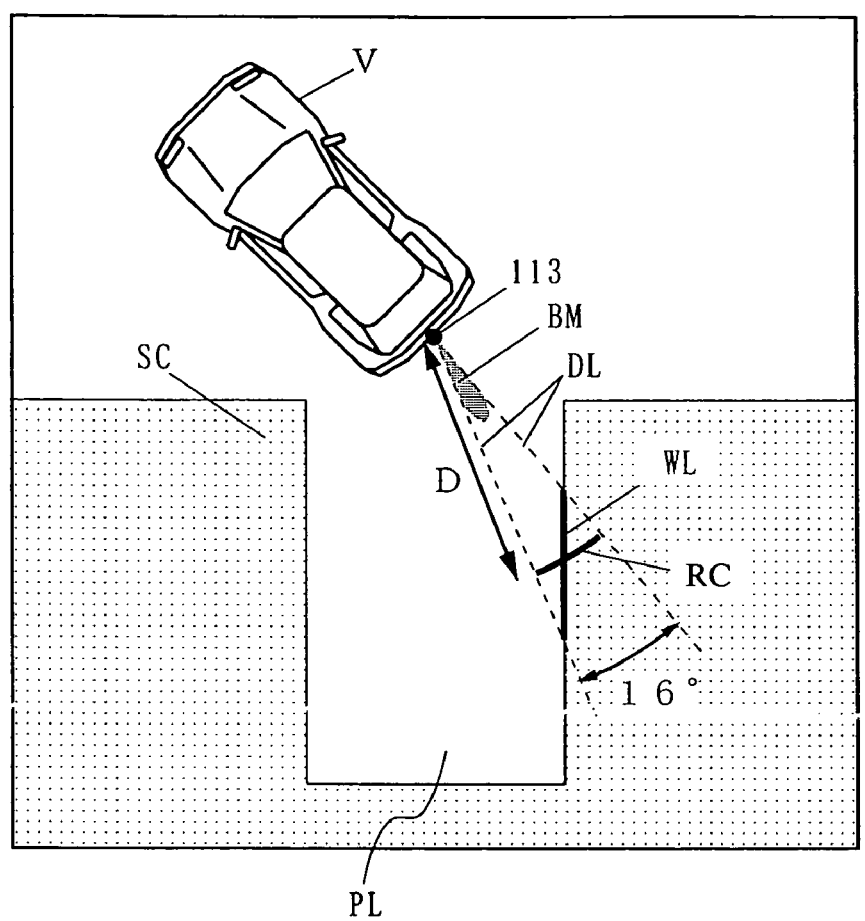
FIG. 4 is a schematic diagram for explaining distance data calculated by a distance calculation section in the first embodiment of the present invention.

Next, operations of the obstacle detection device at steps S102 and S103 are described specifically with reference to FIG. 4 and FIG. 5, respectively. FIG. 4 is a diagram illustrating the vehicle V beginning to back to be parked in a parking space PL, as seen from above the vehicle. An obstacle SC is a structure surrounding three sides of the parking space PL. On the rear of the vehicle V, the antenna 113 of the obstacle detection section 11 is installed. A beam BM, which is emitted from the antenna 113, has a beam divergence angle of about 16° when seen from above the vehicle. The direction in which the beam BM is emitted is shifted by about 6° at each time of emission, and it is emitted ten times in one scanning.

A single beam BM emitted from the antenna 113 travels while spreading within the range between two dotted lines DL to be irradiated on a wall surface WL indicated by a thick line. The beam BM is reflected by the wall surface WL, and the reception section 112 receives a received signal, which is a congregation of reflected waves from various points of the wall surface WL.

Figure 5A:
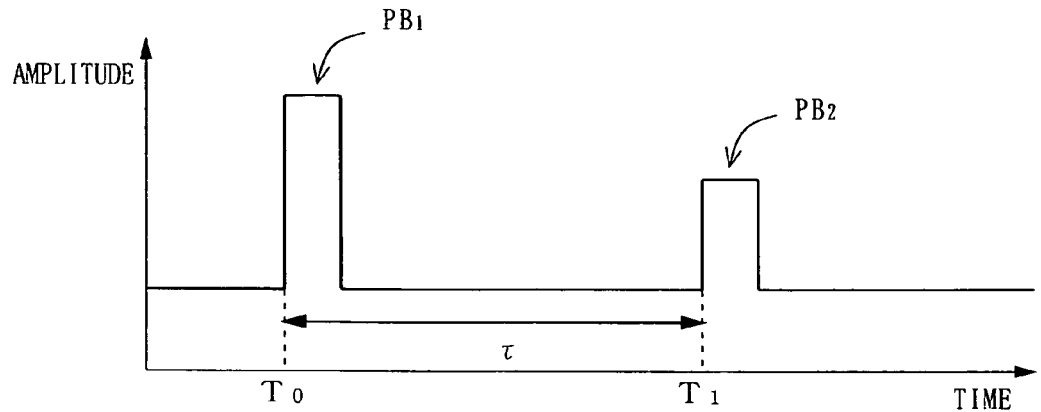
FIGS. 5A to 5C are schematic diagrams illustrating exemplary transmission signals and received signals transmitted or received by the obstacle detection section in the first embodiment of the present invention.
Figure 5B:
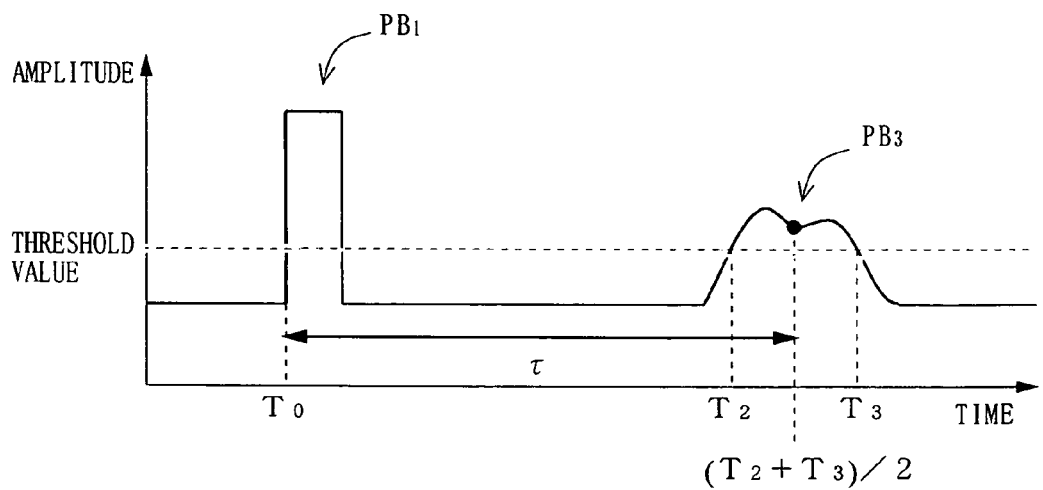

Next, the distance calculation section 12 calculates a distance from the antenna to the obstacle, based on the transmission signal and the received signal (step S104). With reference to FIGS. 5A and 5B, an operation of the distance calculation section 12 when calculating a distance from the antenna 113 to the obstacle is described specifically. In each of FIGS. 5A and 5B, a pulse beam is shown as a transmission signal $PB_1$, and in addition, the reflected waves of the transmission signal $PB_1$, reflected by the obstacle SC are shown as a received signal $PB_2$.

FIG. 5A shows an ideal received signal $PB_2$, which is as clearly rectangular in shape as the transmission signal $PB_1$. A time amount $\tau$, which is a difference between a time $T_0$ at which the transmission signal $PB_1$ is emitted from the antenna 113 and a time $T_1$, at which the received signal $PB_2$ is received by the antenna 113, corresponds to the lengths of time it takes for a beam and the reflected waves (i.e., radio waves) thereof to travel from the antenna 113 to the obstacle SC and respectively vice versa. Here, the distance D between the antenna 113 and the obstacle SC is given by the following formula (1).

$$D = \frac{c\tau}{2} \qquad (1)$$

In the above formula (1), c refers to the speed of light. In practice, however, as illustrated in FIG. 4, in the case where the distance from the antenna 113 varies from point to point of the obstacle SC on which the beam is irradiated, the lengths of time it takes for the reflected waves caused by the reflection at various points of the obstacle SC to reach the antenna vary. Consequently, the received signal becomes wavy, dispersed in the time direction. In addition, the reception section 112 receives not only the reflected waves but also noise. As a result, instead of a clear rectangular shape, the received signal takes a shape like that of a received signal $PB_3$ having a distorted waveform as shown in FIG. 5B. With such a received signal $PB_3$, it is difficult to identify the time amount $\tau$, and therefore it is difficult to calculate the distance D precisely.

Then, in order to distinguish the received signal from noise, a predetermined threshold value for the amplitude of reflected waves is provided, and the distance calculation section 12 calculates an average value during a period of time during which the amplitude of the received signal is greater than the threshold value. More specifically, the distance calculation section 12 detects a time $T_2$ at which the received signal $PB_3$ exceeds the threshold value and a time $T_3$ at which the amplitude of the received signal $PB_3$ thereafter falls below the threshold value, thereby obtaining a time amount $\tau$, which is a difference between the average value of the time $T_2$ and the time $T_3$, and the time $T_0$. By using the aforementioned formula (1) based on the thus obtained time amount $\tau$, the distance between the antenna 113 and the detected obstacle SC is calculated.

With reference to FIG. 4 again, the distance from the antenna 113 to the obstacle SC calculated by the distance calculation section 12 as described above is explained specifically. Because the beam BM emitted from the antenna 113 is reflected at numerous points of the wall surface WL situated within the irradiation range thereof, reflected waves from various points of the wall surface WL ranging from the point closest to the antenna 113 and the point farthest from the antenna 113 are received in congregation. The distance D, calculated as described above based on a received signal of such reflected waves, corresponds to an average value between the distance from the antenna 113 to the closest point of the wall surface WL and the distance from the antenna 113 to the farthest point of the wall surface WL. An arc RC illustrated in FIG. 4 represents an arc which, out of a circumference centered around the antenna 113 with a radius equal to the distance D as calculated in the above-described manner, falls within an angular range in which the beam BM has been irradiated.

By thus calculating a distance to the obstacle SC with respect to each direction in which a beam BM is emitted, the location of the obstacle SC existing in the vicinity of the vehicle is detected. Here, the narrower the beam divergence angle is, the more limited the angular range within which the detected obstacle SC can be situated becomes, so that the location of the obstacle SC can be determined more precisely. On the other hand, the wider a divergence angle the beam BM has, the more roughly the location of the obstacle SC is detected. Moreover, given the same divergence angle of the beam BM, the irradiation range of the beam BM becomes narrower as the distance from the antenna 113 to the obstacle SC becomes shorter. Consequently, the shorter the distance from the antenna 113 to the obstacle SC is, the more precisely the location of the obstacle SC can be detected. On the other hand, the longer the distance from the antenna 113 to the obstacle SC is, the more roughly the location of the obstacle SC is detected.

Note that it is required that the threshold value for detecting the received signal be previously set. However, any object may become an obstacle SC while the vehicle is actually traveling, and the reflectance of radio waves varies depending on the material and shape of an object. Therefore, in practice, it is preferable that objects to be detected as obstacles SC be previously identified to some extent, and that an amplitude value which enables detection of the object having the lowest reflectance among those objects be set as the threshold value.

Next, the control section 13 stores the direction data representing the direction in which a beam has been emitted and the distance data obtained by the calculation by the distance calculation section 12 (step S105). The control section 13 determines whether a scanning has been completed based on whether the number of times a beam has been emitted has reached a predetermined number (which is, in the present embodiment, assumed to be ten, for example) a beam is to be emitted in one scanning (step S106). If the control section 13 determines that the scanning has not been completed yet, control returns to step S101, and the scanning continues. On the other hand, if it is determined that the scanning has been completed, the control section 13 proceeds to step S107.

The obstacle image creation section 14 creates an obstacle image for displaying the location of the obstacle, based on the direction data and the distance data stored in the control section 13 (step S107).

Figure 6:
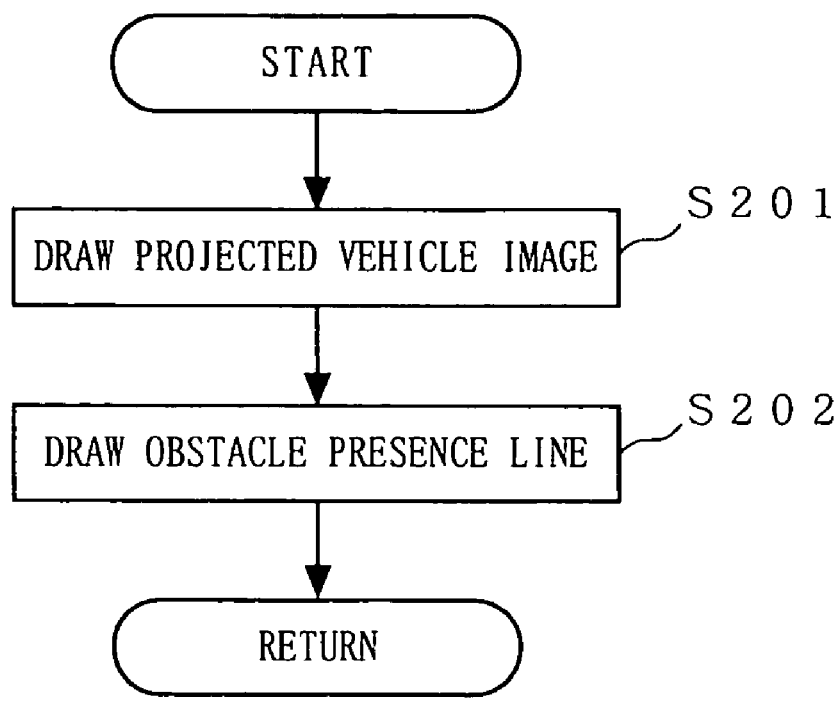
FIG. 6 is a flowchart illustrating an operation of subroutine step S107 in FIG. 3 in the first embodiment of the present invention.
Figure 7:
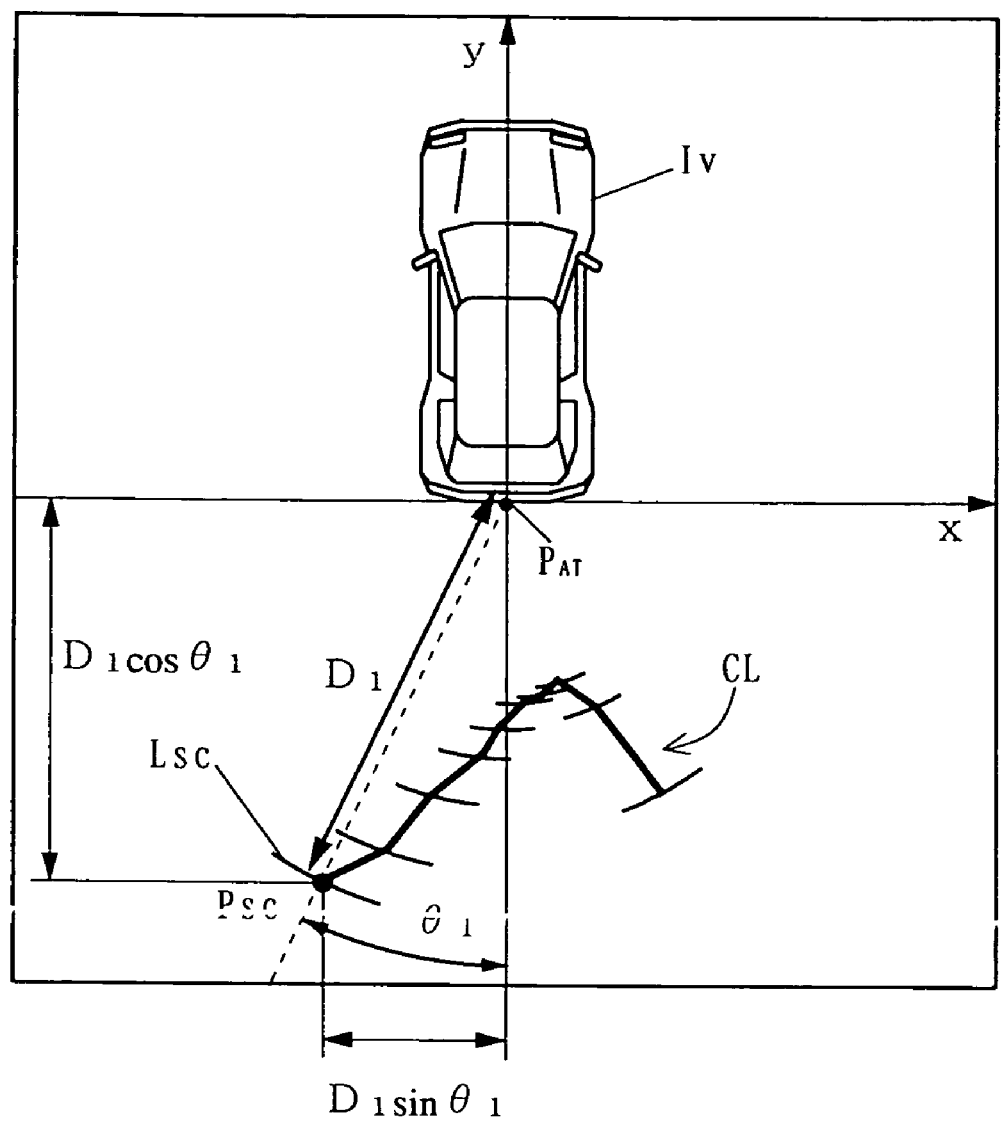
FIG. 7 is a diagram for explaining an operation when an obstacle image creation section creates an obstacle image in the first embodiment of the present invention.

Next, with reference to FIG. 6 and FIG. 7, an operation of the obstacle image creation section 14 at step S107 is described specifically. FIG. 6 is a flowchart showing the subroutine process performed by the obstacle image creation section 14 at step S107. In FIG. 7, an obstacle image created at step S107 is shown. The obstacle image creation section 14 first draws a projected vehicle image $I_V$, which is a projection of the vehicle from above (step S201). At this time, coordinates are defined with an origin being set at the location $P_{AT}$ of the antenna of the projected vehicle image $I_V$, where the location $P_{AT}$ is set at the same location as a point on the actual vehicle at which the antenna 113 is installed.

Next, the obstacle image creation section 14 draws at least one "obstacle presence line" $L_{SC}$ based on each of ten sets of direction data and distance data stored in the control section 13 (step S202). The obstacle presence line $L_{SC}$ is an exemplary obstacle image in the present embodiment, corresponding, for example, to the arc RC shown in FIG. 4, and indicates a detected location of the obstacle with respect to each one of the irradiation directions of the emitted beams BM. More specifically, for each piece of direction data and the corresponding piece of distance data thereof, the obstacle image creation section 14 draws an arc centered around the location $P_{AT}$ of the antenna (i.e., the origin), with the distance data defining its radius and the arc extending over an angular range of about 16° having a center-line direction indicated by the direction data. For example, the obstacle presence line $L_{SC}$ shown in FIG. 7 is an obstacle presence line in the case where the direction data is $\theta_1$ and the distance data is $D_1$. After the above-described step S202, the process proceeds to the next subroutine step S108 (see FIG. 3).

Figure 8:
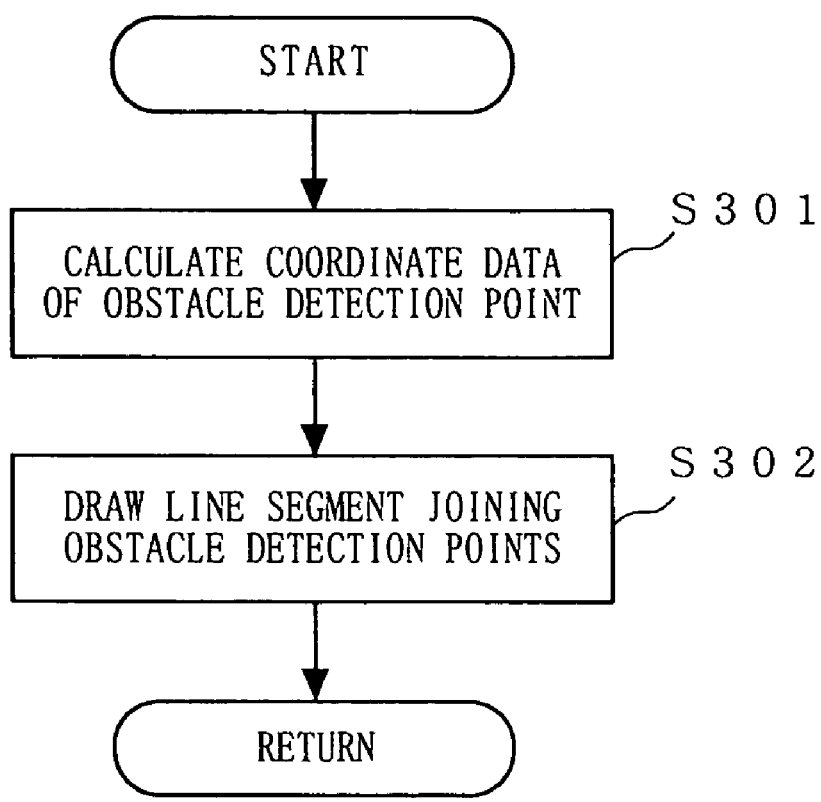
FIG. 8 is a flowchart illustrating an operation of subroutine step S108 in FIG. 3 in the first embodiment of the present invention.
Figure 9A:
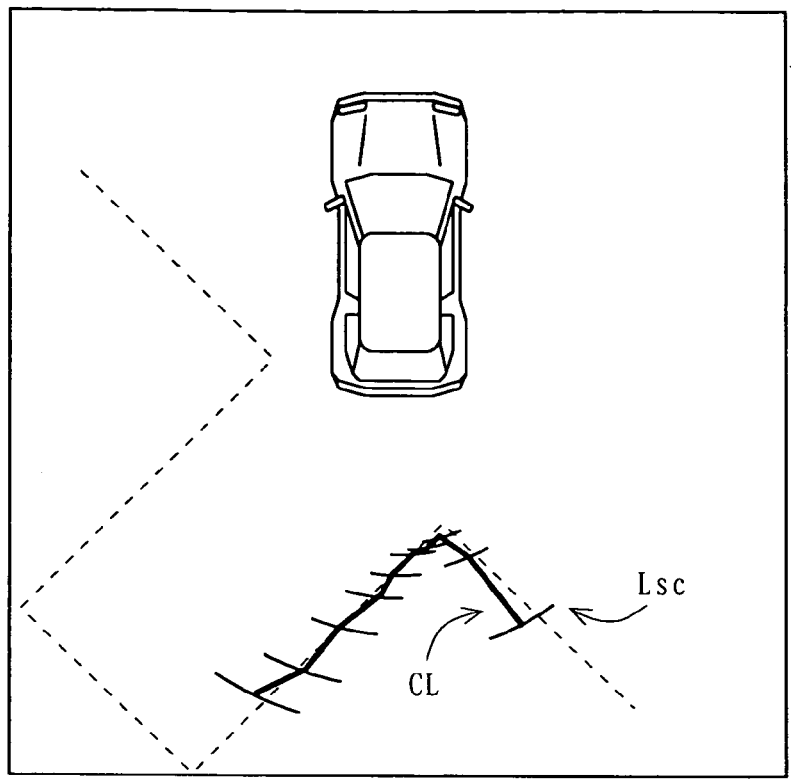
FIGS. 9A and 9B are schematic diagrams illustrating exemplary obstacle images displayed on a display section in the first embodiment of the present invention.
Figure 9B:
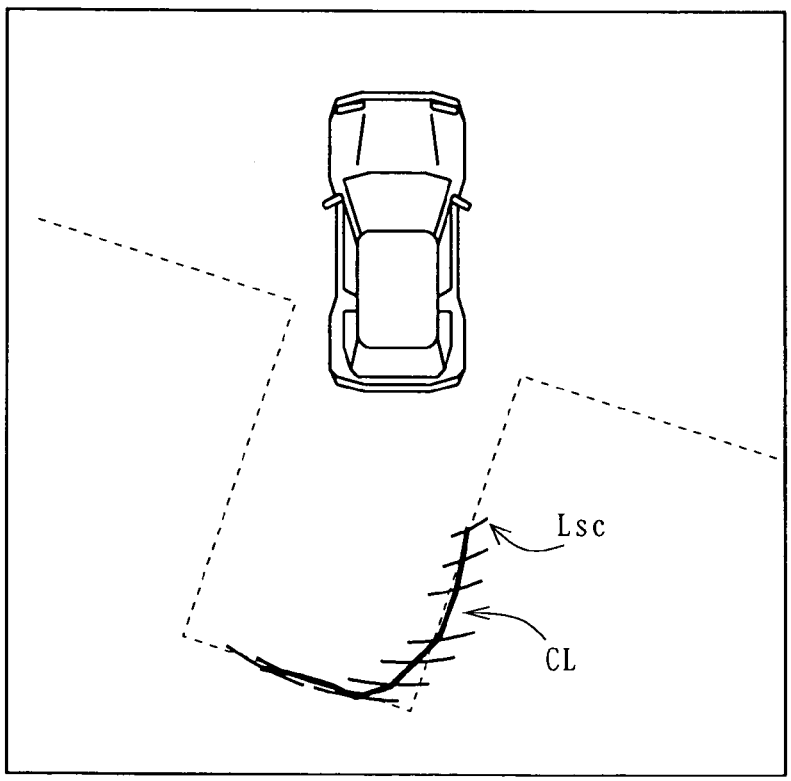
Figure 10A:
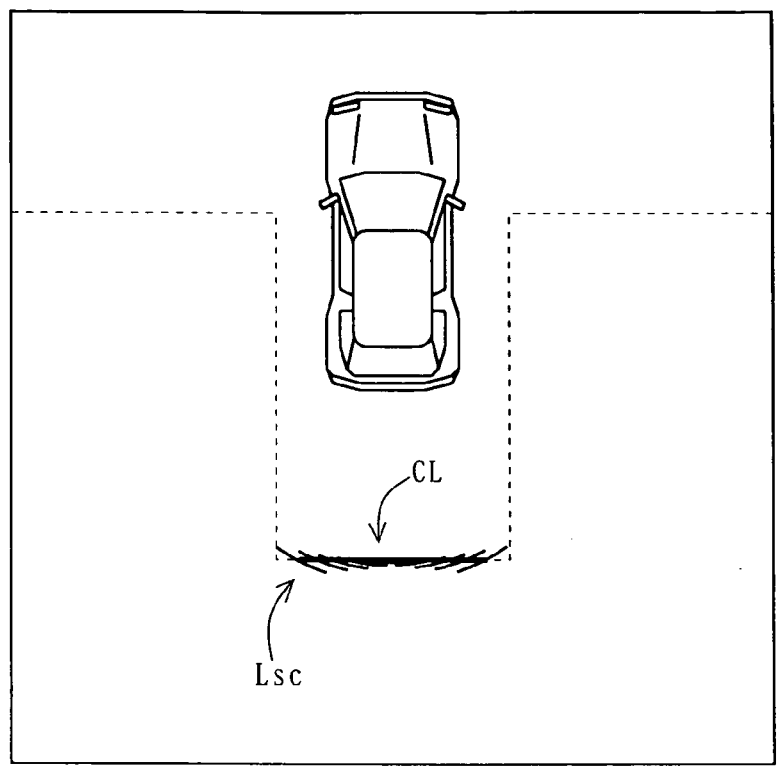
FIGS. 10A and 10B are schematic diagrams illustrating other exemplary obstacle images displayed on the display section in the first embodiment of the present invention.
Figure 10B:
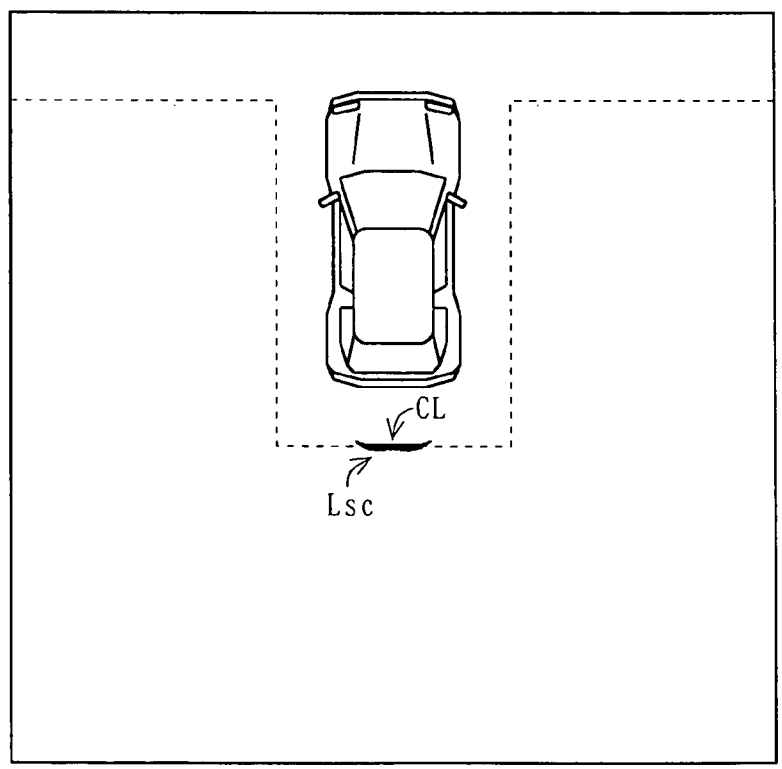

At step S108, the obstacle image creation section 14 draws a line segment representing the shape of the detected obstacle. FIG. 8 is a flowchart showing the subroutine process of step S108. Based on both of the direction data and the distance data, the obstacle image creation section 14 calculates coordinates of a point (hereinafter referred to as an "obstacle detection point") $P_{SC}$ that indicates a detected location of the obstacle (step S301). For example, the point $P_{SC}$ illustrated in FIG. 7 is an obstacle detection point of the obstacle in the case where the direction data and the distance data are $\theta_1$, and $D_1$, respectively. In this case, the coordinates of the point $P_{SC}$ are $(x, y)=(D_1 \sin \theta_1, D_1 \cos \theta_1)$. The obstacle image creation section 14 draws a kinked line joining the coordinates of obstacle detection points $P_{SC}$ calculated at step S301 one after another (step S302). After the process of the above-described step S302, the operation of the obstacle detection device returns to the main routine shown in FIG. 3.

Referring back to FIG. 3, the display section 15 displays, for the driver, the obstacle image created at step S107 by the obstacle image creation section 14 (step S109). The control section 13 determines whether the system of the obstacle detection device is on or not (step S110). The on/off of the system of the obstacle detection device is inputted, for example, through an operation by the driver via a selector switch provided in the input section 16. If the above determination is Yes, the control section 13 resets the counter of the number of times a beam has been emitted (step S111), and the process returns to step S101, then commencing a scanning of the obstacle again. On the other hand, if the above determination is No, the operation of the obstacle detection device is finished.

FIGS. 9A and 9B and FIGS. 10A and 10B show obstacle images at respective stages until the vehicle V shown in FIG. 4 has moved into the parking space PL. Although, in each of these figures, a line corresponding to the external shape of the real obstacle is shown by a dotted line for the sake of mutual comparison, note that the dotted line is not drawn in an actual obstacle image. As is apparent from these obstacle images, as the distance to the obstacle becomes shorter with the movement of the vehicle, the irradiation range of a beam becomes more limited, so that an obstacle presence line (an arc) becomes shorter and the location of the obstacle is drawn more precisely. The driver, referring to the kinked line CL joining the middle points of the obstacle presence lines $L_{SC}$, grasps the shape of the obstacle. In each figure, for the sake of convenience, a reference mark "$L_{SC}$" is attached to only one obstacle presence line.

As described above, the present obstacle detection device draws the obstacle presence line $L_{SC}$ which indicates a location of the obstacle in terms of a distance from the vehicle within the irradiation range of a beam, thereby displaying a range in which the obstacle is very likely to be present. Moreover, the present obstacle detection device draws line segments joining points each of which indicates a representative location of the obstacle detected for the irradiation angle range of each beam, thereby displaying the shape of the obstacle. This enables the driver to easily grasp the location and shape of an obstacle in the vicinity of the vehicle even in the case where a radar whose beam divergence angle is relatively wide is used.

Figure 5C:
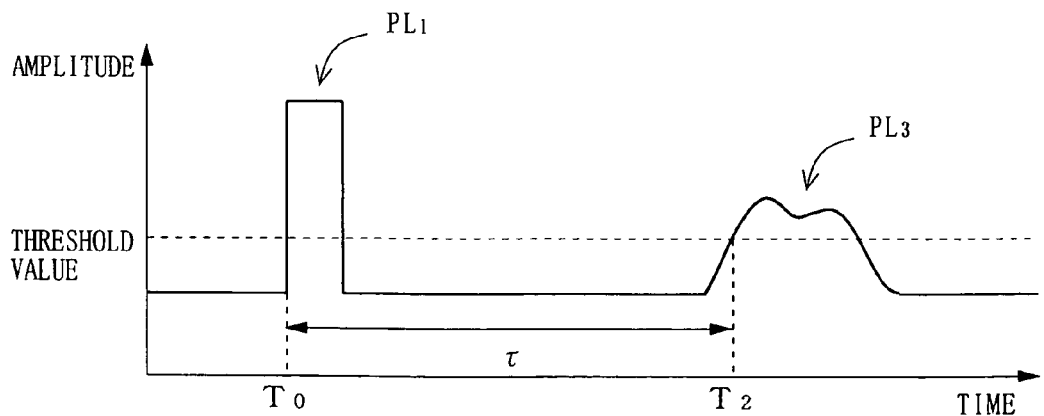

In the present embodiment, the distance calculation section 12 calculates a distance to the obstacle by regarding as the time amount τ a difference between the average value in a period of time during which the amplitude of the received signal is greater than a predetermined threshold value and the time at which a beam was emitted. Alternatively, as shown in FIG. 5C, the distance to the obstacle may be calculated by regarding as the time amount τ a difference between the time $T_2$, at which the amplitude of the received signal first exceeds the predetermined threshold value, and the time $T_0$, at which the beam was emitted based on the transmission signal. The distance calculated in this manner is a distance to, out of any obstacle(s) existing within the irradiation range of each beam, an obstacle shortest to the vehicle, and the obstacle presence line drawn in the obstacle image indicates a location closest to the vehicle at which the obstacle detected in the irradiation range of each beam may exist. Therefore, the driver can avoid contact of the vehicle with an obstacle by performing a driving operation so that the projected vehicle image $I_V$ in the obstacle image does not come in contact with the obstacle presence line $L_{SC}$.

In addition, it has been assumed in the obstacle detection section 11 of the present obstacle detection device that an array antenna is used to electronically change the direction in which a beam is emitted. However, the direction in which the beam is emitted may be changed mechanically by changing the direction of an antenna that emits a beam in one predetermined direction.

Second Embodiment

Next, an obstacle detection device according to a second embodiment of the present invention is described. The obstacle detection device according to the present embodiment is characterized in that the obstacle presence lines in the obstacle image is drawn in thicker lines as the distance from the radar to an obstacle becomes shorter. Because of this feature, an obstacle image creation section 14 included in the present obstacle detection device performs different processes from those of the above-described first embodiment.

Figure 11:
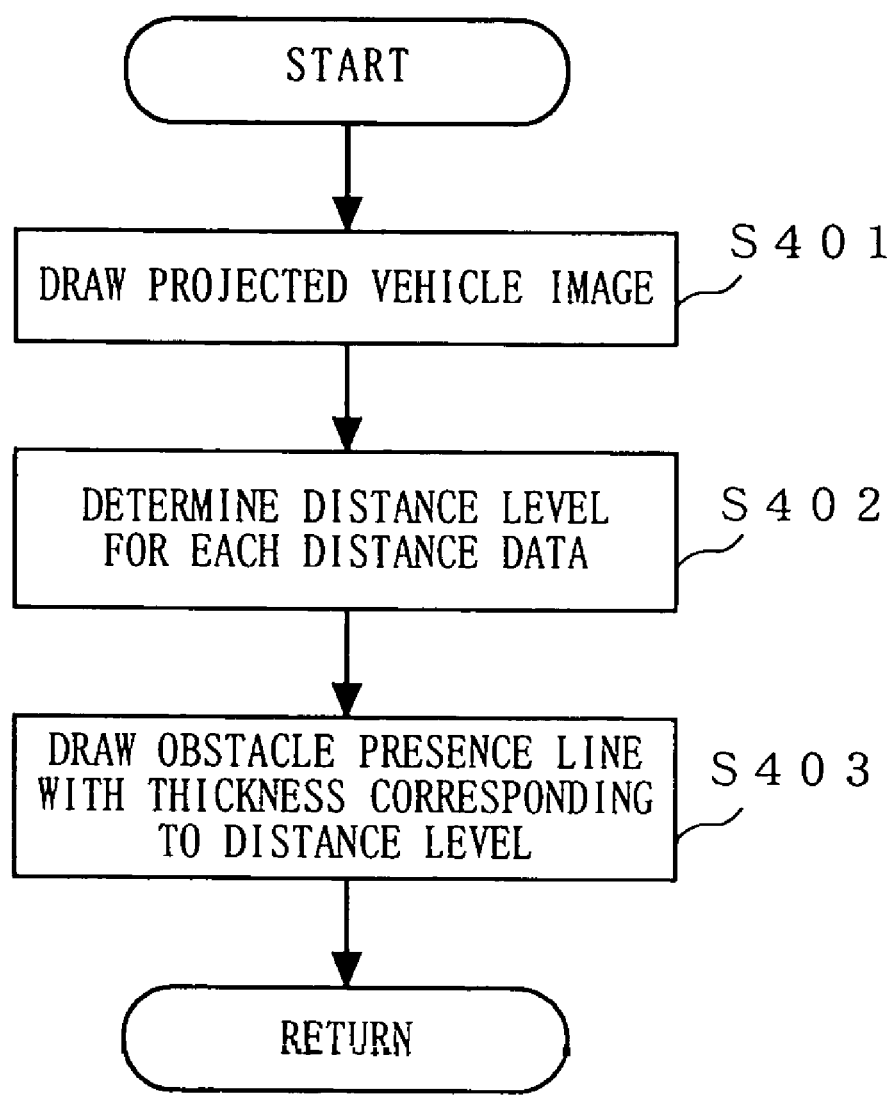
FIG. 11 is a flowchart illustrating an operation of subroutine step S107 in FIG. 3 in the second embodiment of the present invention.
Figure 12A:
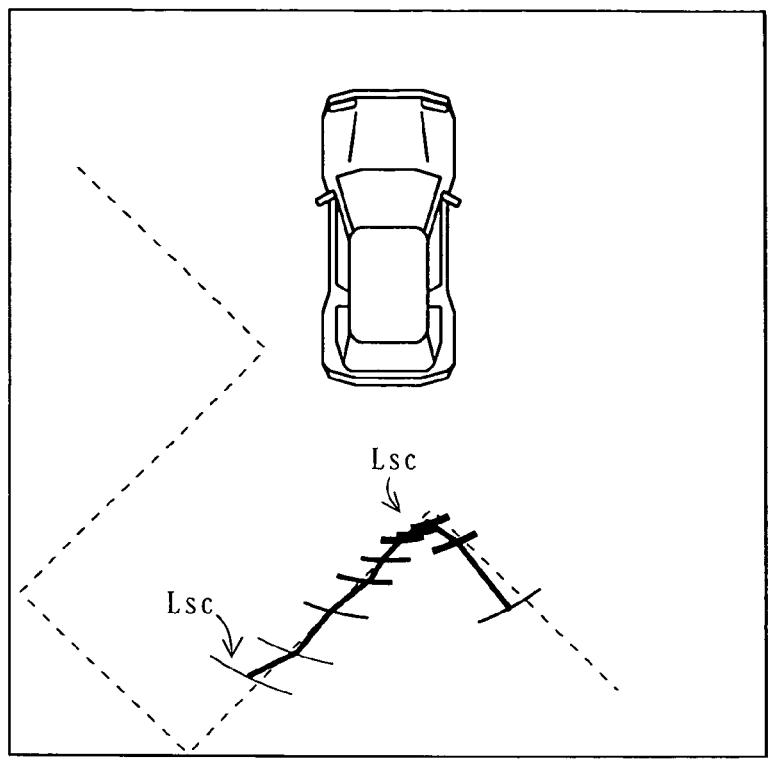
FIGS. 12A and 12B are schematic diagrams illustrating exemplary obstacle images displayed on the display section in the second embodiment of the present invention.
Figure 12B:
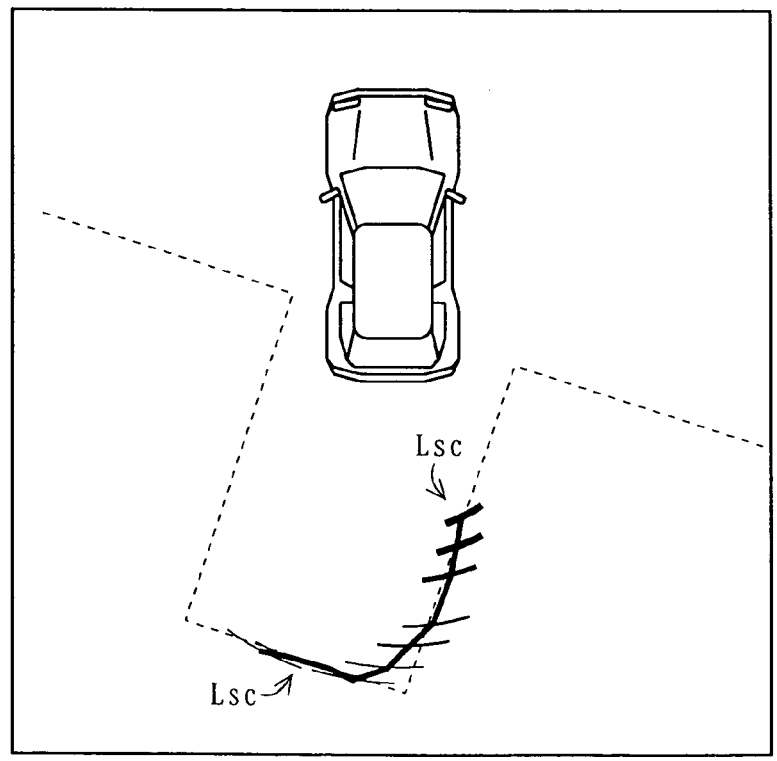
Figure 13A:
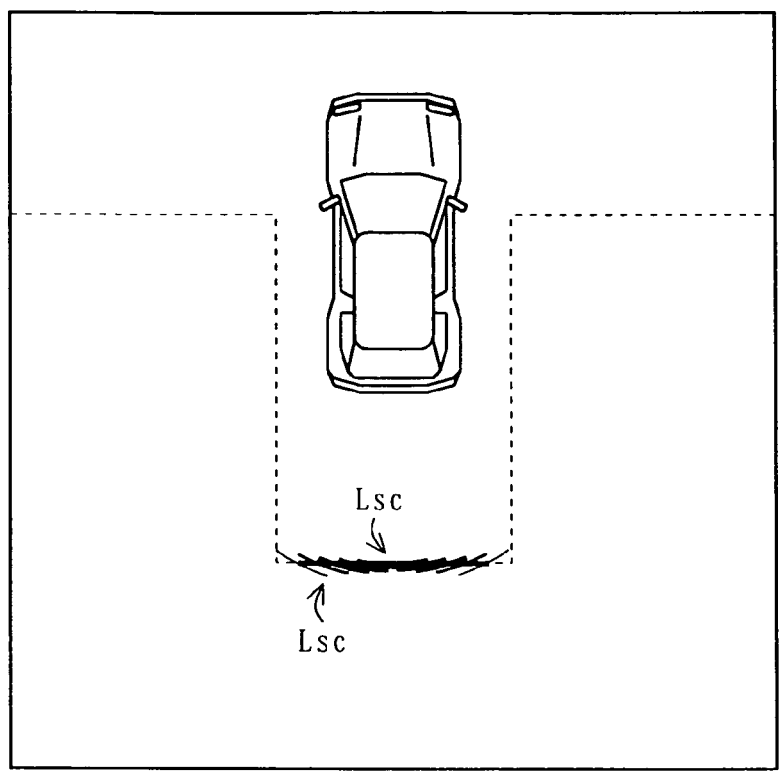
FIGS. 13A and 13B are schematic diagrams illustrating other exemplary obstacle images displayed on the display section in the second embodiment of the present invention.
Figure 13B:
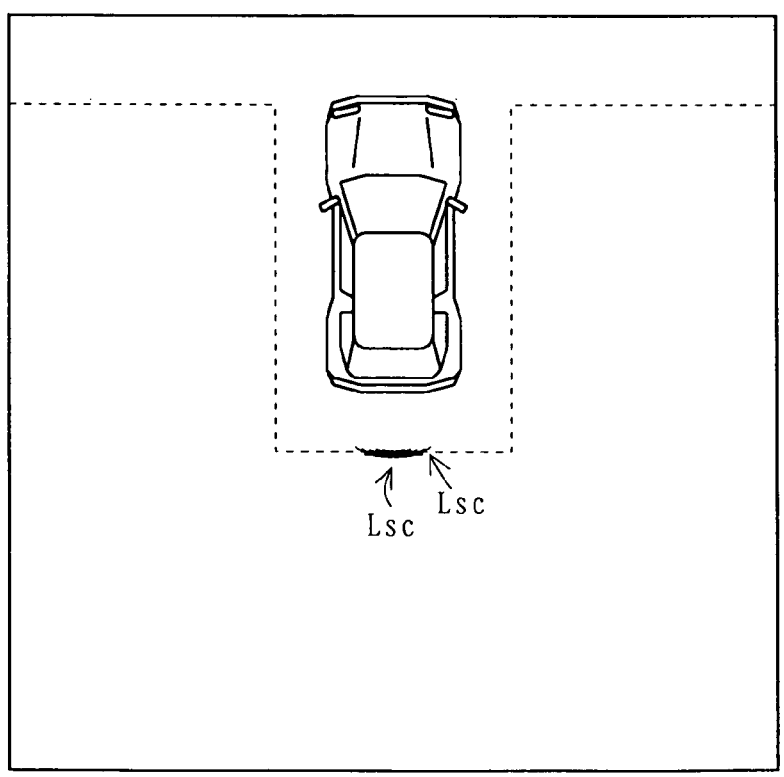

Next, with reference to FIG. 11, an operation of the obstacle image creation section 14 is described with respect to the differences from that in the first embodiment. FIG. 11 is a flowchart showing the operation of the present obstacle image creation section 14. The flowchart of FIG. 11 is identical to the flowchart according to the first embodiment (see FIG. 6) except that the process of step S102 is replaced by step S403 and that the process of step S402 is added. Therefore, among the steps shown in FIG. 11, the description of any step identical to that in FIG. 6 is omitted.

For each one of ten pieces of distance data stored in the control section 13, the obstacle image creation section 14 determines a distance level, which is a stepwise indication of a distance from the vehicle, out of a predetermined number of levels (step S402).

The distance level maybe determined in the following manner, for example. The number of distance levels is assumed to be four, that is, Level 1, Level 2, Level 3, and Level 4 in an ascending order of distance. Assuming $\Delta D = (D_{max} - D_{min}) \div 4$, where $D_{max}$ and $D_{min}$ are respectively the maximum value and minimum value among the ten pieces of distance data stored in the control section 13, the distance level of distance data $D_i$ is determined depending on which one of the following conditional expressions (2) to (5) is satisfied.

$$D_i \leq D_{min} + \Delta D \quad (2)$$

$$D_{min} + \Delta D < D_i \leq D_{min} + 2 \times \Delta D \quad (3)$$

$$D_{min} + 2 \times \Delta D < D_i \leq D_{min} + 3 \times \Delta D \quad (4)$$

$$D_{min} + 3 \times \Delta D < D_i \quad (5)$$

Here, if the distance data $D_i$ satisfies the expression (2), the distance level thereof is determined to be Level 1. If it satisfies the expression (3), the distance level is determined to be Level 2. If it satisfies the expression (4), the distance level is determined to be Level 3. If it satisfies the expression (5), the distance level is determined to be Level 4.

The obstacle image creation section 14 draws an obstacle presence line based on both of the direction data and the distance data, in the same manner as that of the first embodiment, except that the thickness of line is changed according to the distance level determined at step S402 for each distance data (step S403). For example, the thicknesses of lines drawn for the distance levels, i.e., Level 1, Level 2, Level 3, and Level 4, are previously determined to be 1.0 mm, 0.7 mm, 0.4 mm, and 0.2 mm, respectively, and the obstacle image creation section 14 draws obstacle presence lines with thicknesses corresponding to their respective distance levels.

FIGS. 12A and 12B and FIGS. 13A and 13B illustrate obstacle images created by the present obstacle image creation section 14. Although in each of these figures, a line corresponding to the external shape of the real obstacle is shown by a dotted line for the sake of mutual comparison, note that the dotted line is not drawn in an actual obstacle image. Compared with the obstacle images in the first embodiment, these obstacle images are characterized in that the obstacle presence lines for obstacles whose distance from the vehicle is shorter are drawn in progressively thicker lines. From these figures, it is apparent that those obstacle presence lines $L_{SC}$ whose distance from the vehicle is shorter are modified so that the thickness of such obstacle presence lines (arcs) become progressively thicker, whereby the displayed obstacle presence lines $L_{SC}$ become more emphasized.

In the first embodiment, all obstacle presence lines in the obstacle image are drawn with the same thickness. In comparison, the present obstacle detection device draws obstacle presence lines $L_{SC}$ in thicker lines as the distance thereof from the vehicle becomes shorter. In other words, an obstacle presence line $L_{SC}$ indicating the location of an obstacle is drawn with a higher emphasis as the distance thereof to the vehicle becomes shorter. Therefore, it becomes easy for the driver to grasp the location of an obstacle requiring more attention.

In addition, it has been assumed in the present embodiment that the obstacle detection device detects a start time and an end time of a period during which the amplitude of the received signal is greater than a certain threshold value, and determines, as a representative distance between the obstacle and the vehicle, a distance calculated based on a time in the middle of the two; or that the obstacle detection device detects a start time of a period during which the amplitude of the received signal is greater than a certain threshold value, and determines, as a representative distance between the obstacle and the vehicle, a distance calculated based on the start time. However, the manner in which a representative distance is calculated is not restricted to the above, and a so-called under-sampling method may be used, for example. The under-sampling method is a method for detecting a received signal, which stands on the presupposition that the duration of a plurality of pulse repetition periods are sufficiently minute as compared with the relative velocity between the vehicle and the obstacle, and that the distance between the vehicle and the obstacle will remain unchanged for the duration. Correlation between a copy of the transmission signal and the received signal is checked, while shifting the received signal by one minute time per shift instance. When the presence of a correlation is determined in view of a high amplitude of the correlated waveform, if information as to the minute time by which the received signal has been shifted is known, the obstacle detection device determines a distance calculated based thereon to be a representative distance between the obstacle and the vehicle.

This method does not require a high-speed A/D converter, which is required for calculation of the representative distances described in the present embodiment, thereby making it possible to calculate a representative distance with a simpler hardware configuration.

Note that it has been assumed in the present embodiment that based on the distance from the vehicle, the thickness of the obstacle presence line $L_{SC}$ is changed. Alternatively, it may be so arranged that the color of the obstacle presence line $L_{SC}$ is changed. This allows the obstacle detection device to display obstacle presence lines $L_{SC}$ so as to look more emphasized as the distance thereof from the vehicle becomes shorter, as in the case where the thickness of the obstacle presence line $L_{SC}$ is changed.

Third Embodiment

Next, an obstacle detection device according to a third embodiment of the present invention is described. The obstacle detection device according to the second embodiment indicates a location of a detected obstacle with an arc the thickness of whose line changes according to the distance from the vehicle. In comparison, the present obstacle detection device is characterized in that a location of a detected obstacle is indicated by a figure (hereinafter referred to as an "obstacle presence area") $A_{SC}$ having an area, and that the brightness of the figure is changed according to the distance from the vehicle. Because of this feature, an obstacle image creation section 14 included in the present obstacle detection device performs different processes from those of the above-described second embodiment.

Figure 14:
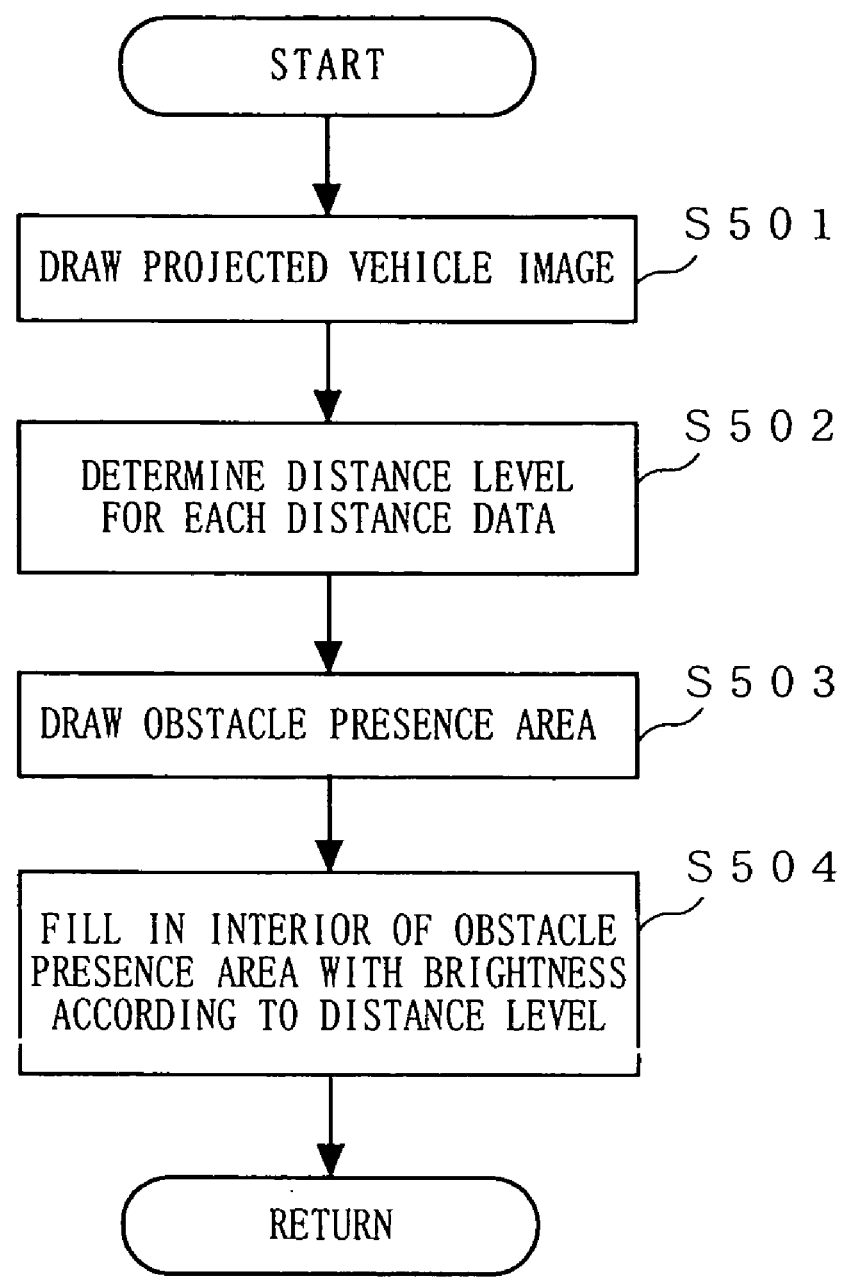
FIG. 14 is a flowchart illustrating an operation of subroutine step S107 in FIG. 3 in the third embodiment of the present invention.

Next, with reference to FIG. 14, processes performed by the obstacle image creation section 14 are described with respect to the differences from those in the second embodiment. FIG. 14 is a flowchart showing an operation of the present obstacle image creation section 14. The flowchart shown in FIG. 14 is identical to the flowchart according to the second embodiment (see FIG. 11) except that the process of step S403 is replaced by the processes of step S503 and step S504. Therefore, among the steps shown in FIG. 14, the description of the steps identical to those in FIG. 11 is omitted.

Figure 15:
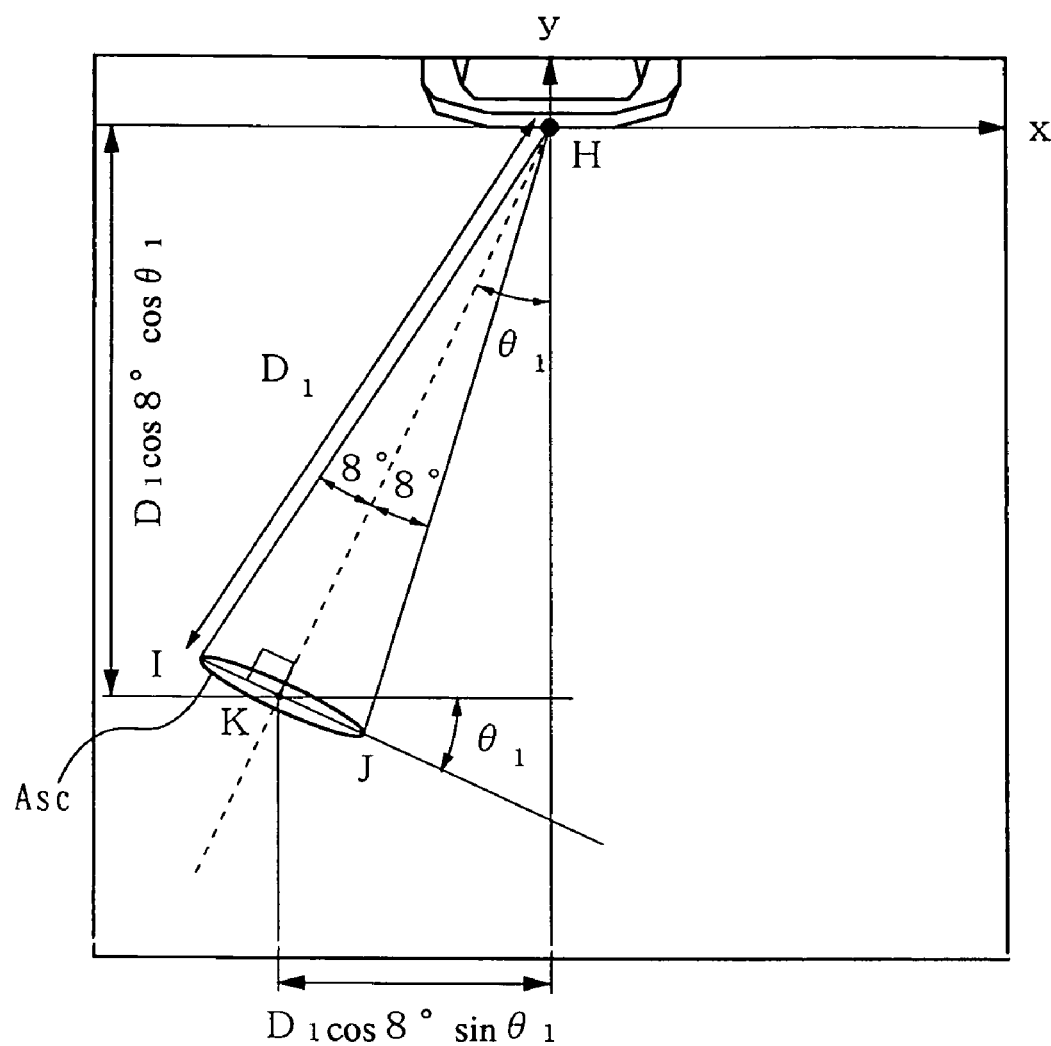
FIG. 15 is a diagram for explaining an operation when an obstacle image creation section creates an obstacle image in the third embodiment of the present invention.
Figure 16A:
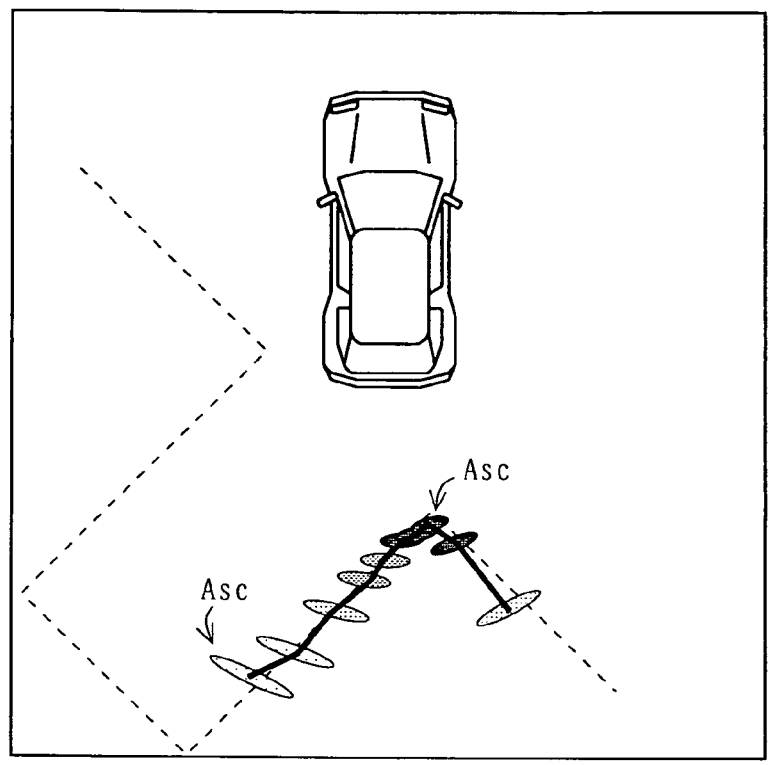
FIGS. 16A and 16B are schematic diagrams illustrating exemplary obstacle images displayed on a display section in the third embodiment of the present invention.
Figure 16B:
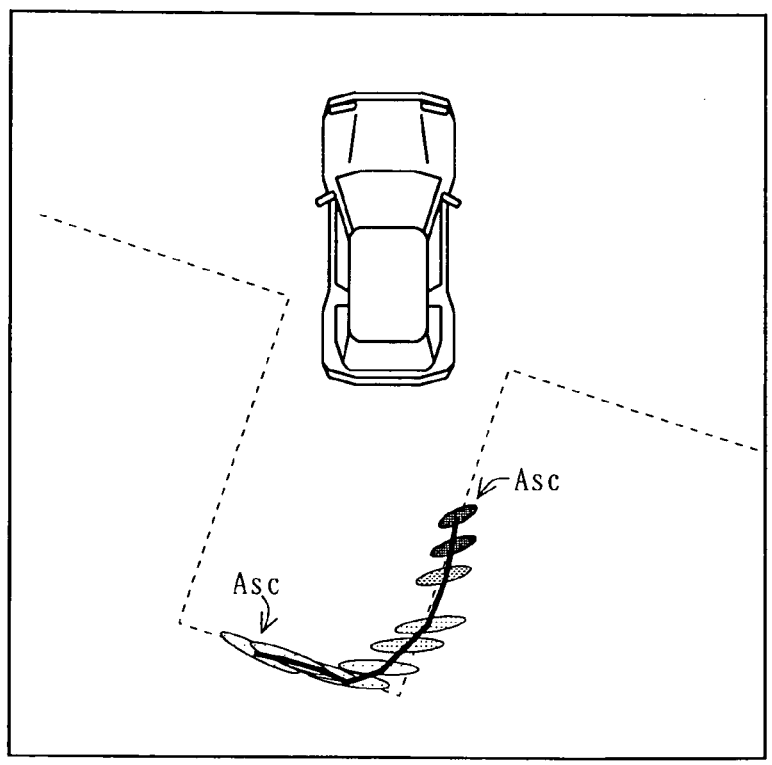
Figure 17A:
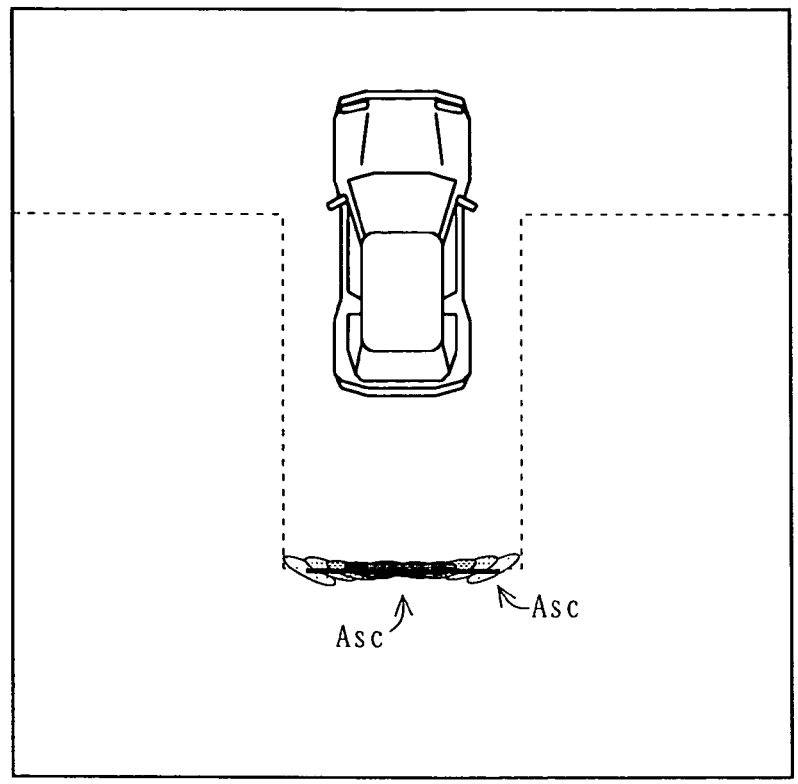
FIGS. 17A and 17B are schematic diagrams illustrating other exemplary obstacle images displayed on the display section in the third embodiment of the present invention.
Figure 17B:
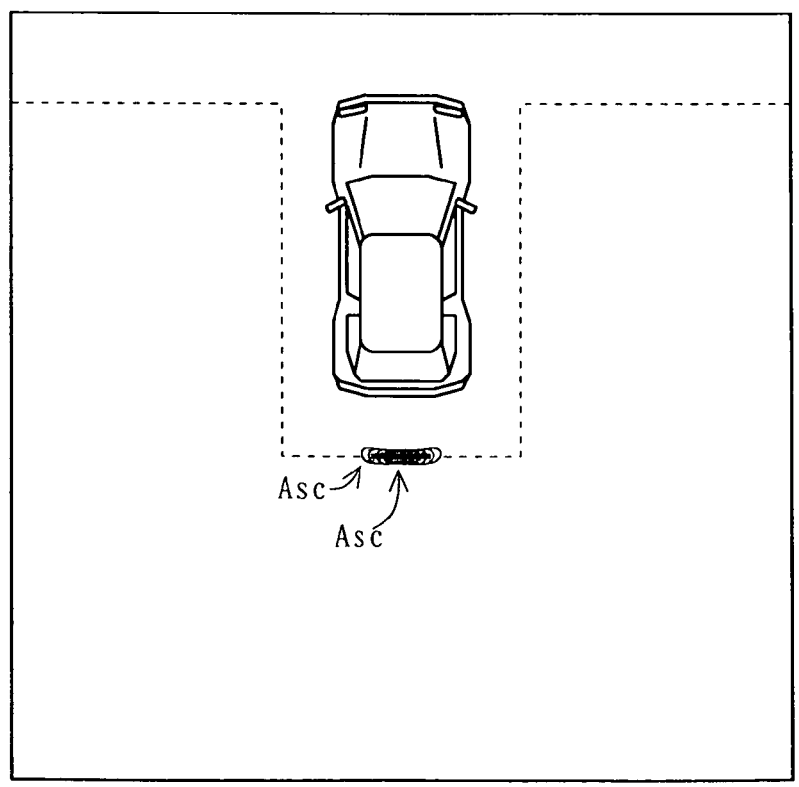

The obstacle image creation section 14 draws an obstacle presence area $A_{SC}$ based on both of the direction data and the distance data (step S503). With reference to FIG. 15, an operation performed by the obstacle image creation section 14 at step S503 is described specifically below. FIG. 15 shows an obstacle presence area $A_{SC}$ drawn at step S503. The obstacle presence area $A_{SC}$ illustrated in FIG. 15 has been drawn based on direction data $\theta_1$ and distance data $D_1$, and is an ellipse whose major axis corresponds to the irradiation range of a beam emitted in the direction. Point H shown in FIG. 15 is the location of the antenna, and point I, point J, and point K are, respectively, two end points of the major axis of the ellipse which is the obstacle presence area $A_{SC}$, and the center of the obstacle presence area $A_{SC}$. Note that the obstacle presence area $A_{SC}$ corresponds to the obstacle presence line $L_{SC}$ in FIG. 7, and point I and point J coincide with the end points of the obstacle presence line $L_{SC}$.

The obstacle image creation section 14 calculates the length of the major axis of the ellipse and the coordinates of the center of the ellipse, based on the direction data and the distance data. In FIG. 15, the major axis IJ of the ellipse is a line segment joining two points which are both at the distance $D_1$ from the antenna and whose directions differ from each other by about 16°. Therefore, the major axis IJ corresponds to the length of the remaining side of an isosceles triangle whose two sides each having a length of $D_1$ form an internal angle of about 16°. Here, because point K is the middle point of the side IJ, triangles $\Delta$HIK and $\Delta$HJK are each a right-angled triangle whose hypotenuse has a length of $D_1$ and one of whose internal angles is about 8°. Therefore, the lengths of the side IK and the side JK are both $D_1 \sin 8°$, and the length of the major axis IJ to be obtained is $2D_1 \sin 8°$.

The coordinates of the center K of the ellipse are obtained in the following manner. The triangle $\Delta$HIK in FIG. 15 is a right-angled triangle whose hypotenuse HI has a length of $D_1$, and whose internal angle $\Delta$IHK is about 8°. Therefore, the length of the side HK is $D_1 \cos 8°$. That is, because point K is a point whose direction seen from the antenna is $\theta_1$ and whose distance from the antenna is $D_1 \cos 8°$, the coordinates of the center K of the ellipse are expressed as $(x, y) = (D_1 \cos 8° \sin \theta_1, D_1 \cos 8° \cos \theta_1)$.

The inclination of the obstacle presence area is no other than the angle $\theta_1$ given by the direction data $\theta_1$. The length of the minor axis of the ellipse, which is the obstacle presence area $A_{SC}$, is a predetermined fixed length. The obstacle image creation section 14 draws each obstacle presence area $A_{SC}$ based on the lengths of the major axis and minor axis of the ellipse, the coordinates of the center, and the inclination of the ellipse, which are obtained in the above-described manner based on both of the direction data and the distance data.

Next, the obstacle image creation section 14 fills in the interior of each obstacle presence area $A_{SC}$ drawn at step S503 such that the brightness thereof is changed so that the closer the obstacle is to the vehicle, the more emphasized it looks (step S504). More specifically, the brightness corresponding to each distance level determined at step S502 is previously determined as in the second embodiment, and the obstacle image creation section 14 fills in the interior of each obstacle presence area $A_{SC}$ with the brightness according to the corresponding distance level thereof.

FIGS. 16A and 16B and FIGS. 17A and 17B illustrate obstacle images created by the present obstacle image creation section 14. Although, in each of these figures, a line corresponding to the external shape of the real obstacle is shown by a dotted line for the sake of mutual comparison, note that the dotted line is not drawn in an actual obstacle image. In these obstacle images, the interiors of the obstacle presence areas $A_{SC}$ are filled in with varying brightness such that the shorter the distance of an obstacle presence area $A_{SC}$ from the vehicle is, the more emphasized it looks. It is apparent from these obstacle images that the closer an obstacle presence area $A_{SC}$ is to the vehicle, the more emphasized it is drawn. In addition, as the vehicle moves and the distance thereof to the obstacle becomes shorter, the irradiation range of a beam becomes more limited, so that the major axis of an ellipse which is an obstacle presence area $A_{SC}$ becomes shorter, whereby a location of the obstacle is drawn more accurately.

As described above, according to the present obstacle detection device, the closer an obstacle is to the vehicle, the more emphasized an obstacle presence area $A_{SC}$, which indicates a location of the obstacle, is drawn. Therefore, it becomes easy for the driver to grasp a location of an obstacle to which attention should be paid.

Note that, in the present embodiment, the brightness of the interior of an obstacle presence areas $A_{SC}$ is changed in accordance with the distance from the vehicle, but alternatively, the pattern thereof may be changed to achieve the virtually same visual effect as in the case where the brightness thereof is changed.

In addition, it has been assumed in the present embodiment that a location of a detected obstacle is indicated by an obstacle presence area $A_{SC}$ which is elliptical in shape. However, another type of figure, such as a rhombus, may be used instead.

Fourth Embodiment

Next, an obstacle detection device according to a fourth embodiment of the present invention is described. The obstacle detection device according to the above-described third embodiment indicates a location of a detected obstacle with one obstacle presence area $A_{SC}$ with respect to each direction in which beams are emitted. In contrast, the present obstacle detection device is characterized in that all obstacle presence areas $A_{SC}$ in an obstacle image according to the third embodiment are replaced by a single embracing figure, and that the interior thereof is drawn so that portions whose distance from the radar is shorter are more emphasized.

Because of this feature, the present obstacle image creation section 14 performs processes different from those of the above-described third embodiment.

Figure 18:
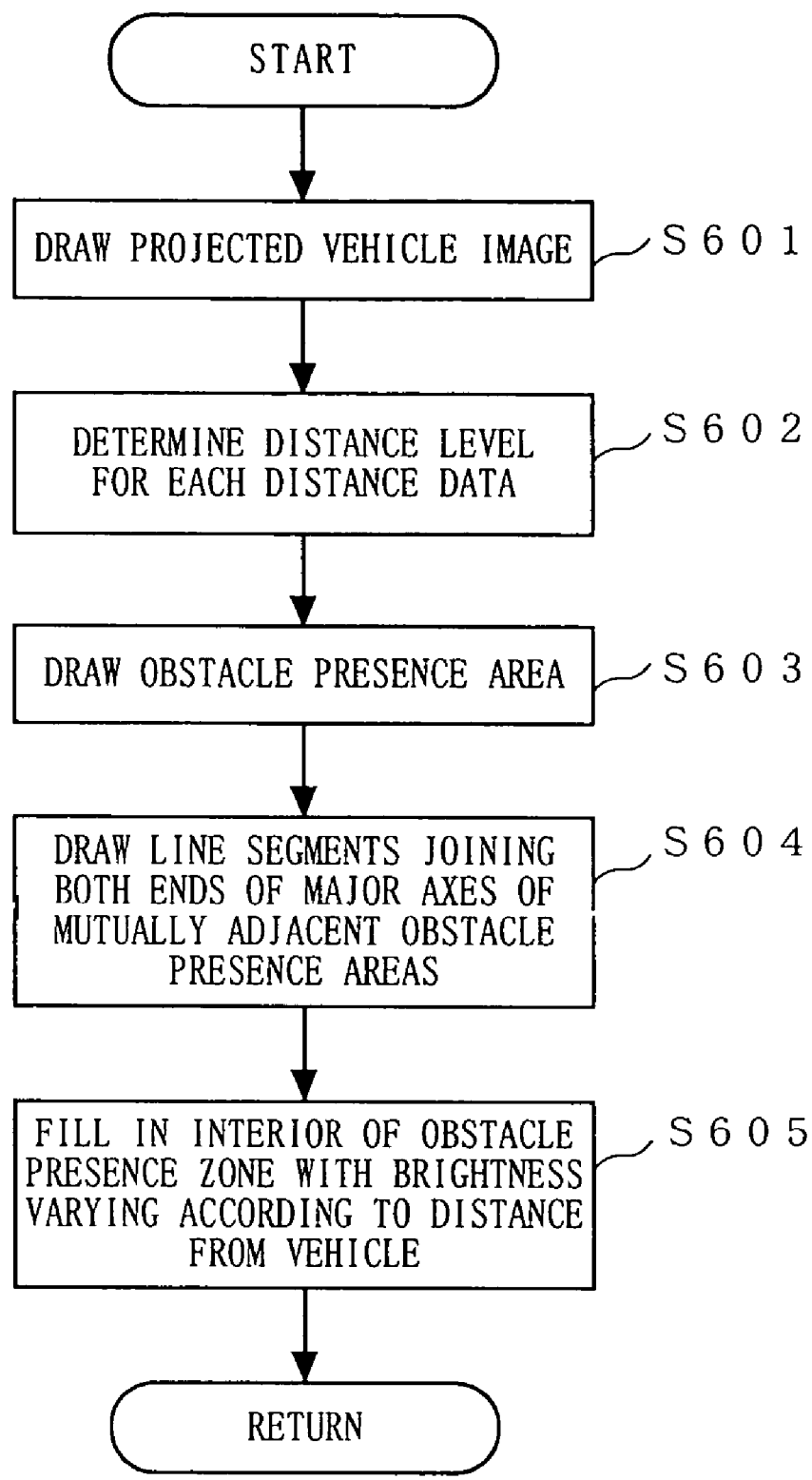
FIG. 18 is a flowchart illustrating an operation of subroutine step S107 in FIG. 3 in the fourth embodiment of the present invention.
Figure 19A:
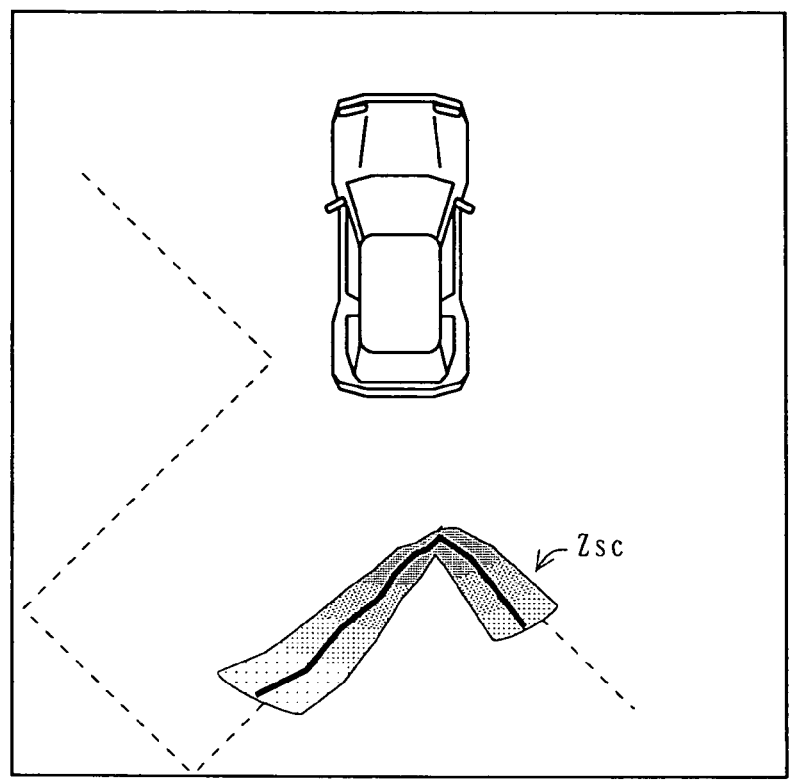
FIGS. 19A and 19B are schematic diagrams illustrating exemplary obstacle images displayed on a display section in the fourth embodiment of the present invention.
Figure 19B:
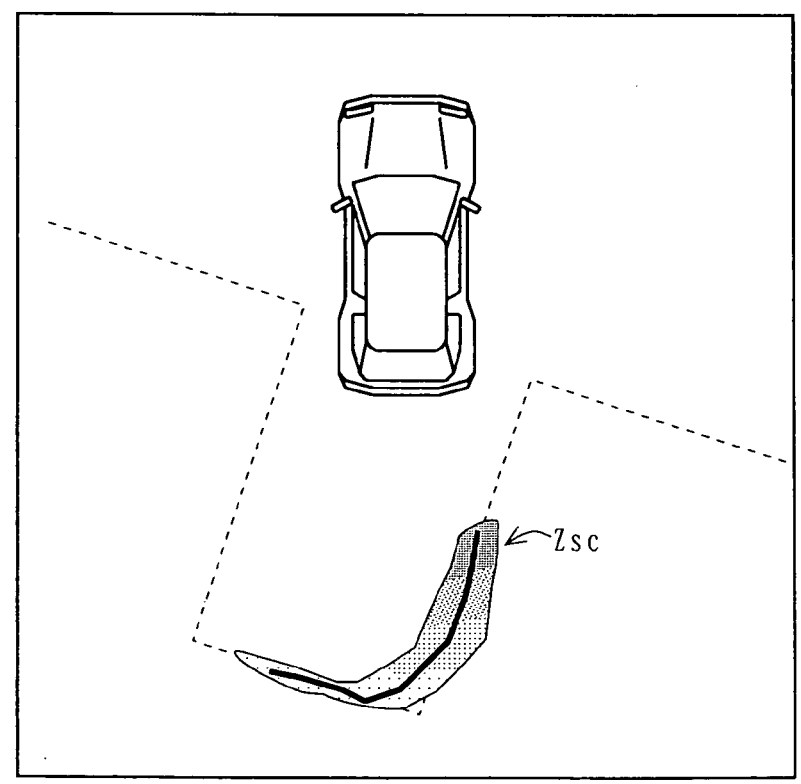
Figure 20A:
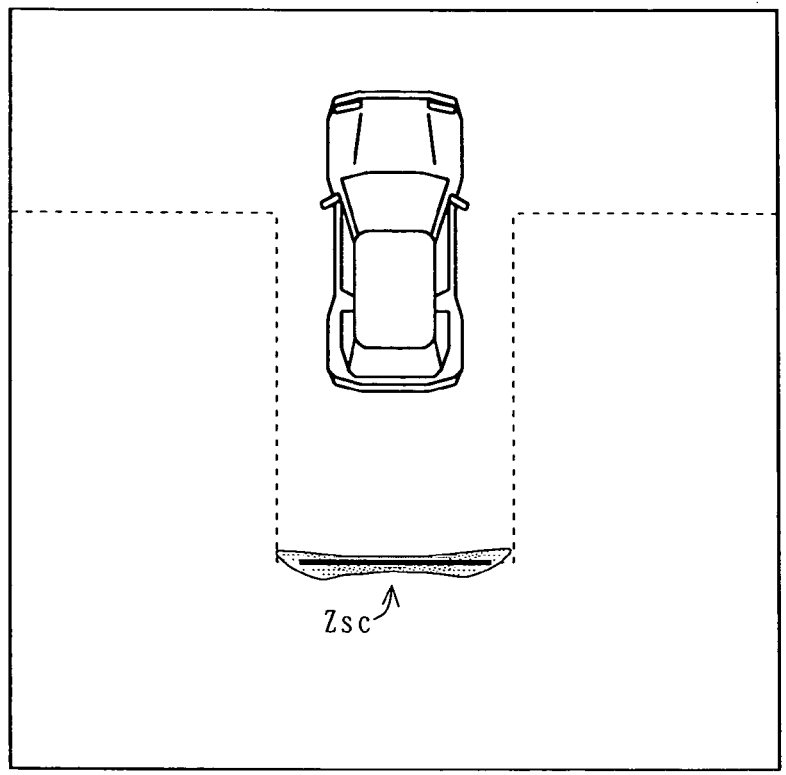
FIGS. 20A and 20B are schematic diagrams illustrating other exemplary obstacle images displayed on the display section in the fourth embodiment of the present invention.
Figure 20B:
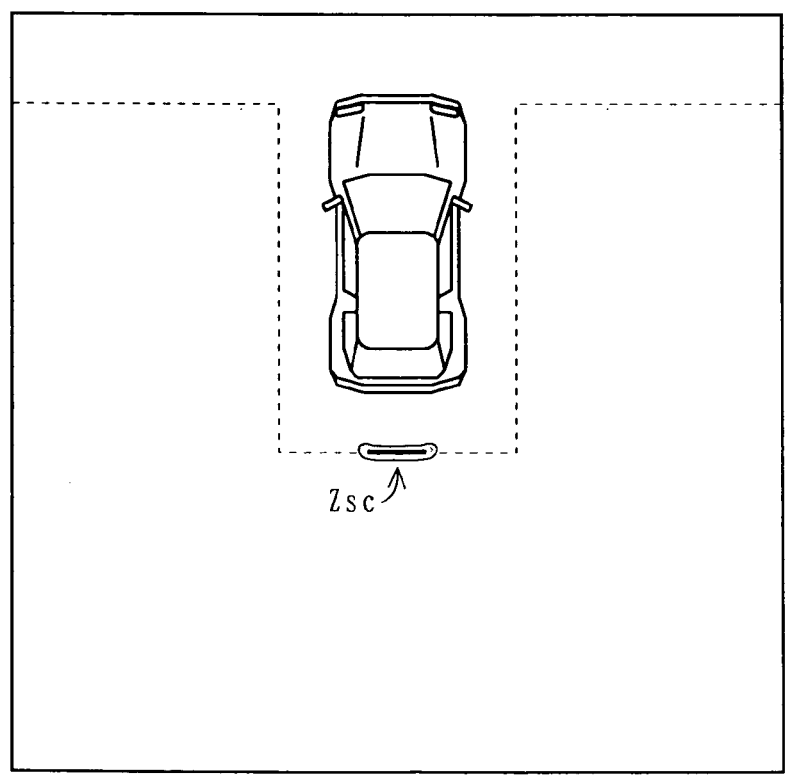

Next, with reference to FIG. 18, an operation of the present obstacle image creation section 14 is described with respect to the differences from that in the third embodiment. FIG. 18 is a flowchart showing the operation of the present obstacle image creation section 14. The flowchart shown in FIG. 18 is identical to the flowchart according to the third embodiment (see FIG. 14) except that the process of step S504 is replaced by the processes of step S604 and step S605. Therefore, among the steps shown in FIG. 18, the description of the steps identical to those in FIG. 14 is omitted.

The obstacle image creation section 14 draws line segments joining the left ends of the major axes of obstacle presence areas $A_{SC}$ in neighboring directions and line segments joining the right ends of the major axes of obstacle presence areas $A_{SC}$ in neighboring directions (step S604). For example, point I, which is the left end of the major axis of the obstacle presence area $A_{SC}$ shown in FIG. 15 is a point whose direction is "$\theta_1-8°$" and whose distance from the antenna is $D_1$, and therefore, the coordinates thereof is expressed as $(x, y)=(D_1 \sin(\theta_1-8°), D_1 \cos(\theta_1-8°))$. Similarly, point J, which is the right end of the major axis of the obstacle presence area $A_{SC}$ is a point whose direction is $(\theta_1+8°)$ and whose distance from the antenna is $D_1$, and therefore, the coordinates thereof is expressed as $(x, y)=(D_1 \sin(\theta_1+8°), D_1 \cos(\theta_1+8°))$.

Next, the obstacle image creation section 14 fills in the interior of an area (hereinafter referred to as an "obstacle presence zone") $Z_{SC}$ covering all obstacle presence areas and including the line segments drawn at step S604, with varying brightness such that line shorter the distance of a portion from the antenna 113 is, the more emphasized the portion becomes (step S605).

The operation, performed at step S605, of the obstacle image creation section 14 filling in the interior of the obstacle presence zone $Z_{SC}$ with brightness changed according to the distance from the antenna 113 is described specifically. For example, in the case where the interior of the obstacle presence zone $Z_{SC}$ is filled in with n degrees of different brightness, the obstacle image creation section 14 divides, at regular intervals, the interior of the obstacle presence zone $Z_{SC}$ by (n-1) concentric circles with the common center being the location of the antenna 113, and fills in each one of the parts of the divided obstacle presence zone $Z_{SC}$ with one of the n degrees of brightness according to the distance from the antenna 113.

More specifically, assuming $\Delta D=(D_{max}-D_{min}) \div n$, where $D_{max}$ and $D_{min}$ are respectively the maximum value and minimum value of the distance data, the radii $R_i$ of the (n-1) concentric circles, by way of which the obstacle presence zone is divided into n parts, are given by the following formula (6).

$$R_i = D_{min} + i \times \Delta D (i=1, 2, 3 \ldots (n-1)) \tag{6}$$

The obstacle image creation section 14 divides the interior of the obstacle presence zone $Z_{SC}$ by (n-1) concentric circles centered around the location of the antenna 113 and having a radius of $R_i$, and fills in the parts one after another with varying brightness, beginning with the part closest to the antenna 113. Note that arcs of the concentric circles dividing the obstacle presence zone $Z_{SC}$ do not have to be drawn.

FIGS. 19A and 19B and FIGS. 20A and 20B each illustrate an obstacle image created by the present obstacle image creation section 14. Although, in each one of these figures, a line corresponding to the external shape of the real obstacle is shown by a dotted line for the sake of mutual comparison, note that the dotted line is not drawn in an actual obstacle image. In each one of these obstacle images, the interiors of obstacle presence areas are filled in with four degree gradation in brightness such that the shorter the distance from an obstacle presence area to the vehicle is, the deeper the obstacle presence area is in color. It is apparent from these figures that in the obstacle presence zone $Z_{SC}$ a portion closer to the vehicle is filled in in a deeper color so as to be more emphasized. It is also apparent that as the distance from the radar to the obstacle becomes shorter, the obstacle presence zone $Z_{SC}$ becomes smaller and the shape of the obstacle is detected more accurately.

As described above, the present obstacle detection device depicts a location of an obstacle existing in the vicinity of the vehicle as an obstacle presence zone $Z_{SC}$, the interior of which is filled in such that a portion closer to the vehicle becomes deeper in color so as to be emphasized. As a result, it becomes easy for the driver to grasp the location of an obstacle to which attention should be paid.

Note that in the present embodiment, the obstacle presence zone $Z_{SC}$ has been described as a figure covering obstacle presence areas $A_{SC}$ and including line segments that join the left ends and right ends, respectively, of the major axis of each obstacle presence area (an ellipse) $A_{SC}$ according to the above-described third embodiment. However, the obstacle presence zone $Z_{SC}$ is not restricted to this, but may be a figure covering obstacle presence areas $A_{SC}$ and including common tangent lines of neighboring obstacle presence areas $A_{SC}$.

It has been assumed in the first through fourth embodiments that an obstacle presence line $L_{SC}$, an obstacle presence area $A_{SC}$, or an obstacle presence zone $Z_{SC}$ which indicates a location occupied by an obstacle in its respective embodiment is displayed concurrently with a kinked line indicating the shape of the obstacle. Alternatively, it may be so arranged that only the obstacle presence line $L_{SC}$, the obstacle presence area $A_{SC}$, or the obstacle presence zone $Z_{SC}$, which indicates a location occupied by an obstacle, is displayed, or that only the kinked line CL indicating the shape of the obstacle is displayed.

Fifth Embodiment

Next, an obstacle detection device according to a fifth embodiment of the present invention is described. A first characteristic feature of the present obstacle detection device is that an accurate shape of an obstacle to be detected is previously registered, and that the positional relationship between the obstacle to be detected and the vehicle is inferred by comparing the shape of the obstacle previously registered with the location of the detected obstacle. The present obstacle detection device is further characterized in that the accurate shape of the obstacle to be detected is displayed together with the positional relationship thereof to the vehicle. Because of these features, the structure and operation of the present obstacle detection device are different from those in the above-described first embodiment in points as described below.

Figure 21:
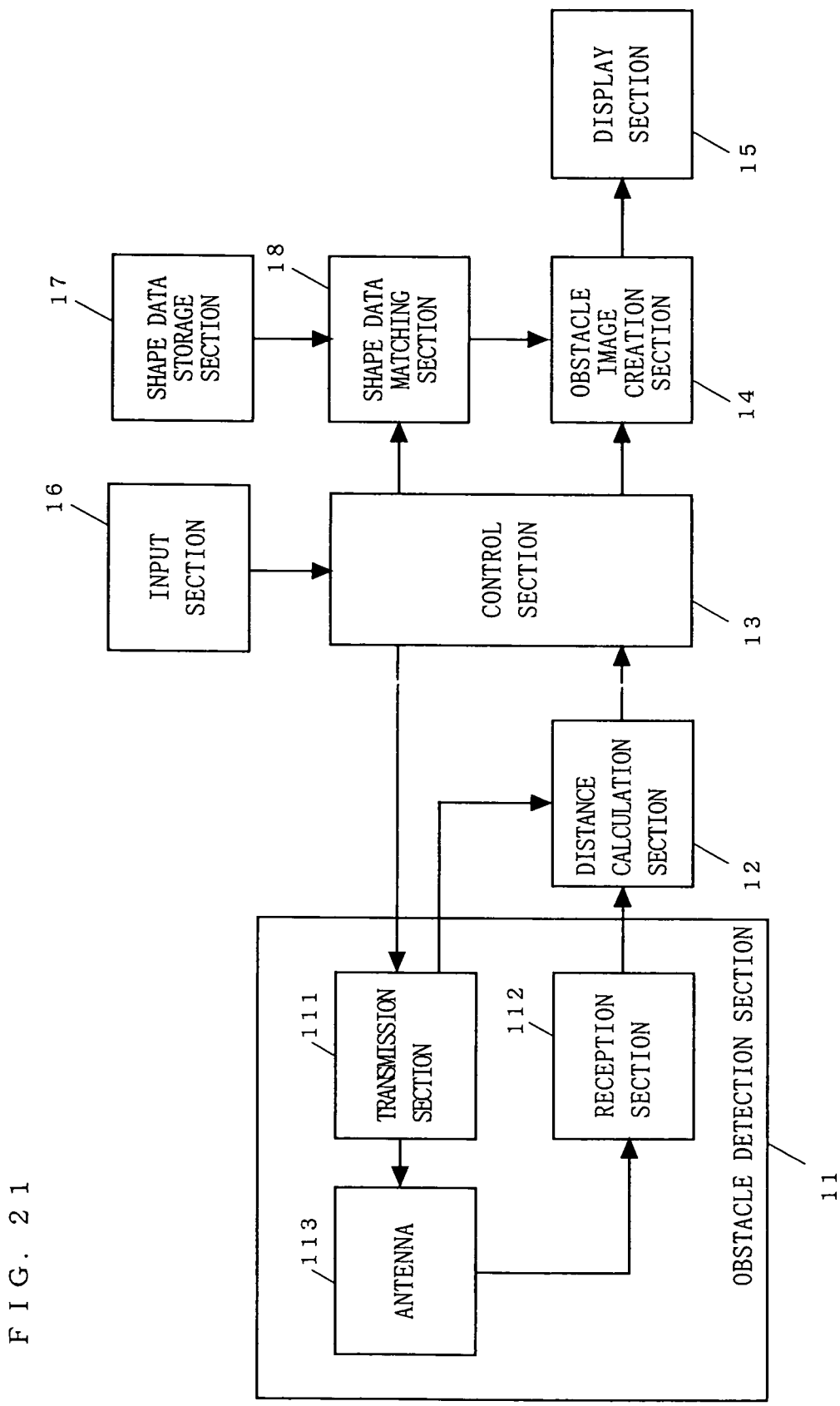
FIG. 21 is a block diagram illustrating a structure of an obstacle detection device according to a fifth embodiment of the present invention.

FIG. 21 is a block diagram showing the structure of the present obstacle detection device. The obstacle detection device as shown in FIG. 21 is different from that in the first embodiment in that a shape data storage section 17 and a shape data matching section 18 are added. Because there is no distinction between the two obstacle detection devices other than this, the same reference numerals are attached to components, among the components of the present obstacle detection device, that are identical to those in the first embodiment, and the description thereof is omitted.

The shape data storage section 17 stores previously inputted data (hereinafter referred to as "shape data") representing the shape of an obstacle such as a garage at a house of the driver.

The shape data matching section 18 reads the shape data stored in the shape data storage section 17, performs matching of the read shape data against a location of an obstacle detected by the obstacle detection section 11, and obtains, in an obstacle image, the location and orientation of the shape data such that the shape of the registered obstacle best overlaps the shape of the detected obstacle.

Here, the shape data is information defining the shape and various attributes of a parking space. In the present embodiment, the shape data includes a shape data number, a shape data name, a parking space type, shape points, and shape vectors. The shape data number and the shape data name are used for identifying registered shape data. The parking space type refers to a kind of parking space, as classified based on the combination of the shape of the parking space, the direction in which a vehicle moves when entering the parking space, parallel parking, bay parking, and the like. The shape points and the shape vectors represent the shape of a registered obstacle by point data or vectors, respectively. The shape data number, the shape data name, and the parking space type are, for example, inputted by the operation of the driver via the input section 16, and the shape points and the shape vectors are calculated based on information inputted via the input section 16 and are stored in the shape data storage section 17.

Figure 22:
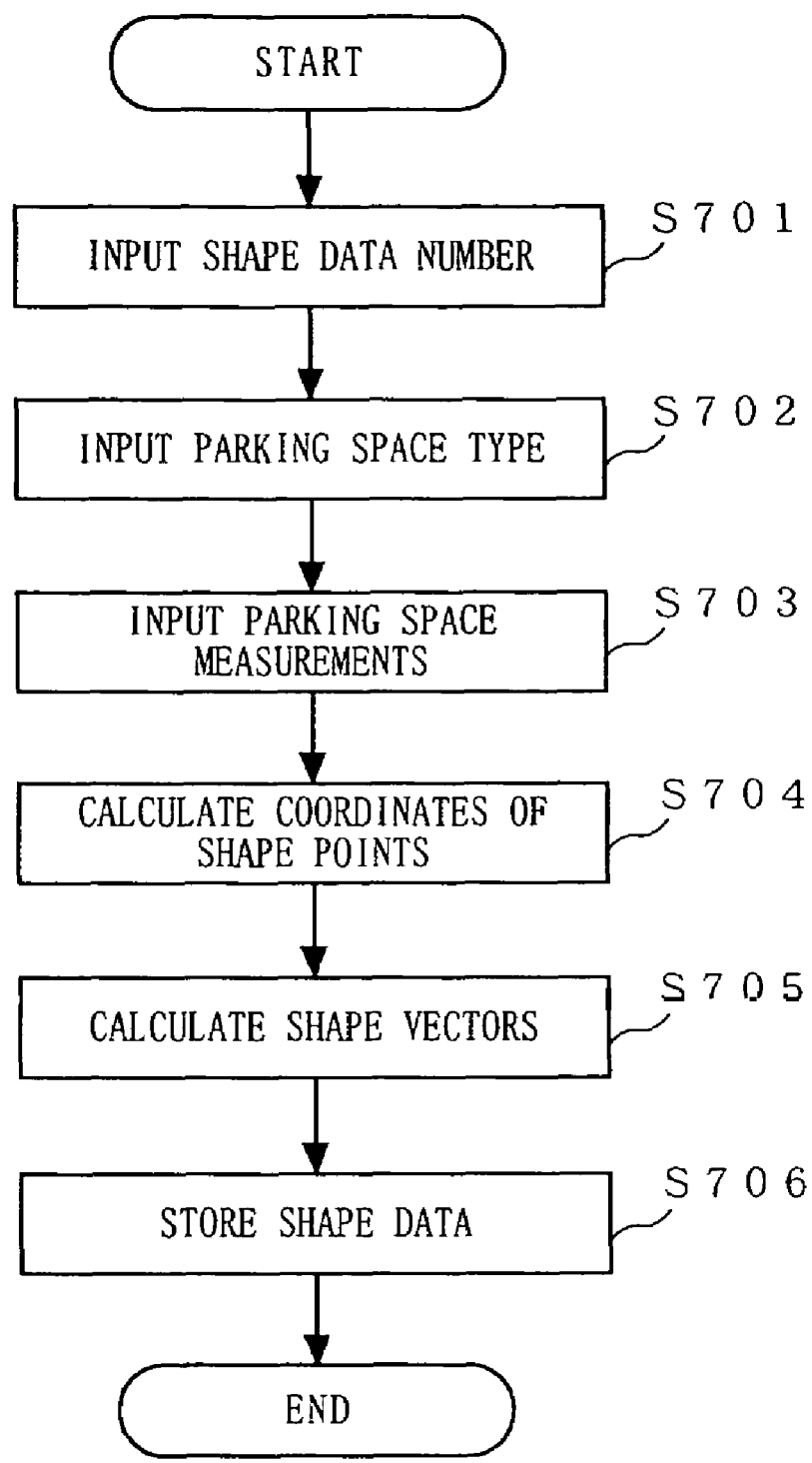
FIG. 22 is a flowchart illustrating an operation when the obstacle detection device according to the fifth embodiment of the present invention sets shape data.
Figure 23:
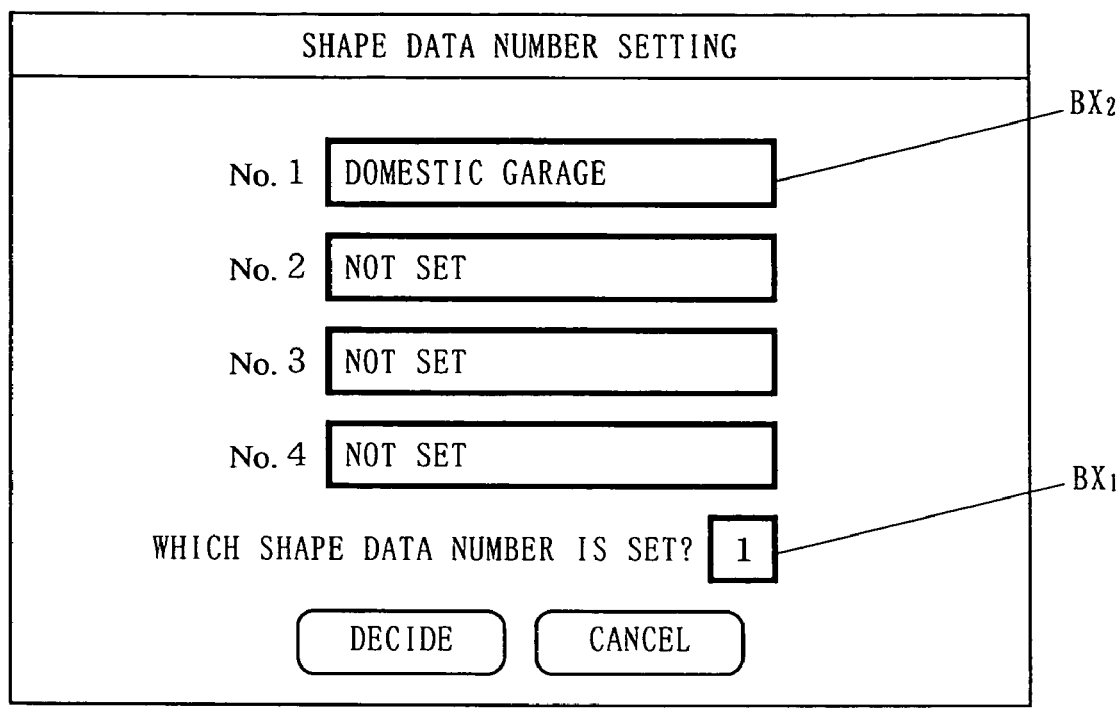
FIG. 23 is an exemplary shape data number setting screen displayed on a display section in the fifth embodiment of the present invention.

Next, with reference to FIG. 22 to FIG. 26, exemplary operation of the obstacle detection device when registering the shape data is described. FIG. 22 is a flowchart showing the exemplary operation of the obstacle detection device when registering the shape data. In FIG. 22, the control section 13 accepts the shape data number inputted via the input section 16 by the operation of the driver or the like (step S701). FIG. 23 illustrates a shape data number setting screen. The driver uses the input section 16 to enter a shape data number of shape data to be registered and a name of the shape data in a shape data number input space $B_{X1}$, and a shape data name input space $BX_2$.

Next, the control section 13 accepts a parking space type inputted via the input section 16 by the operation of the driver (step S702). More specifically, if the driver selects a parking space type which he or she is attempting to register from among previously prepared parking space types by using the input section 16, the control section 13 accepts the inputted parking space type. The parking space type identifies the shape of an obstacle in the surrounding area of a parking space, the direction in which a vehicle moves when entering the parking space, and whether the parking space is on the right side or on the left side of the vehicle when the vehicle begins to enter the parking space.

Figure 24A:
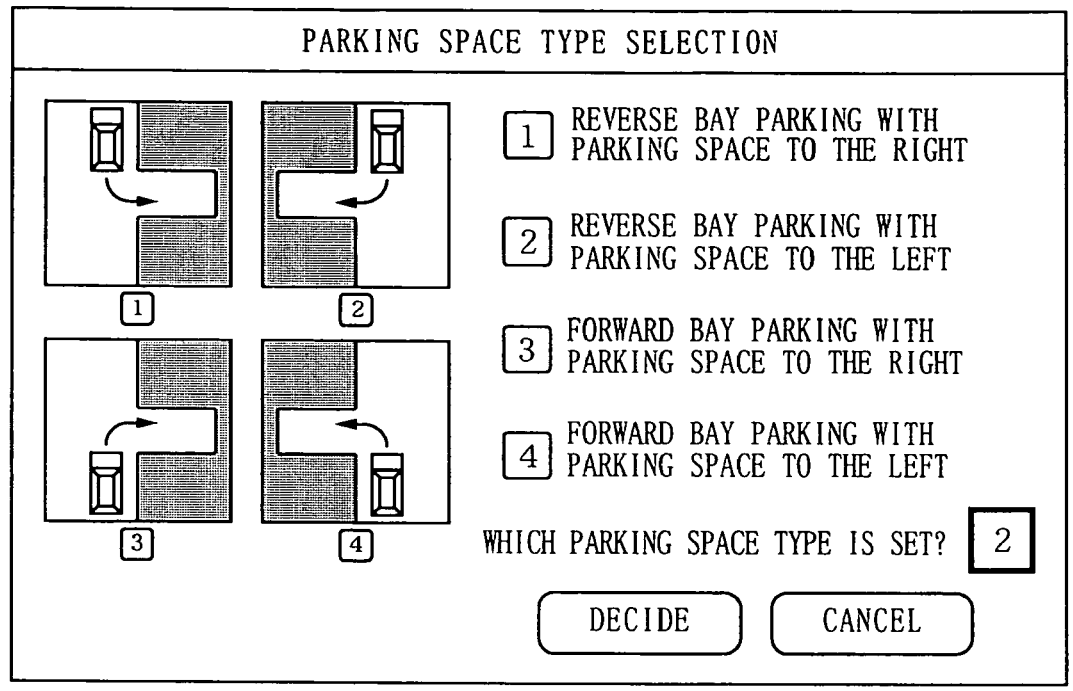
FIGS. 24A and 24B are schematic diagrams illustrating an exemplary parking space type selection screen and an exemplary parking space measurement setting screen displayed on the display section in the fifth embodiment of the present invention.

FIG. 24A illustrates a screen for selecting a parking space type. A parking space type selection screen shown in FIG. 24A shows, with respect to the shape of a single kind of obstacle surrounding a parking space, four kinds of parking space types which are different from one another in terms of the direction in which a vehicle moves when the vehicle enters the parking space, whether the parking space is on the right side or on the left side of the vehicle when the vehicle begins to enter the parking space, and whether the way of parking is parallel parking or bay parking, etc. Note that the parking space types are not restricted to those shown in FIG.

24A, but are prepared so as to be able to deal with various shapes of obstacles SC surrounding a parking space as shown in FIGS. 25A to 25H.

Figure 24B:
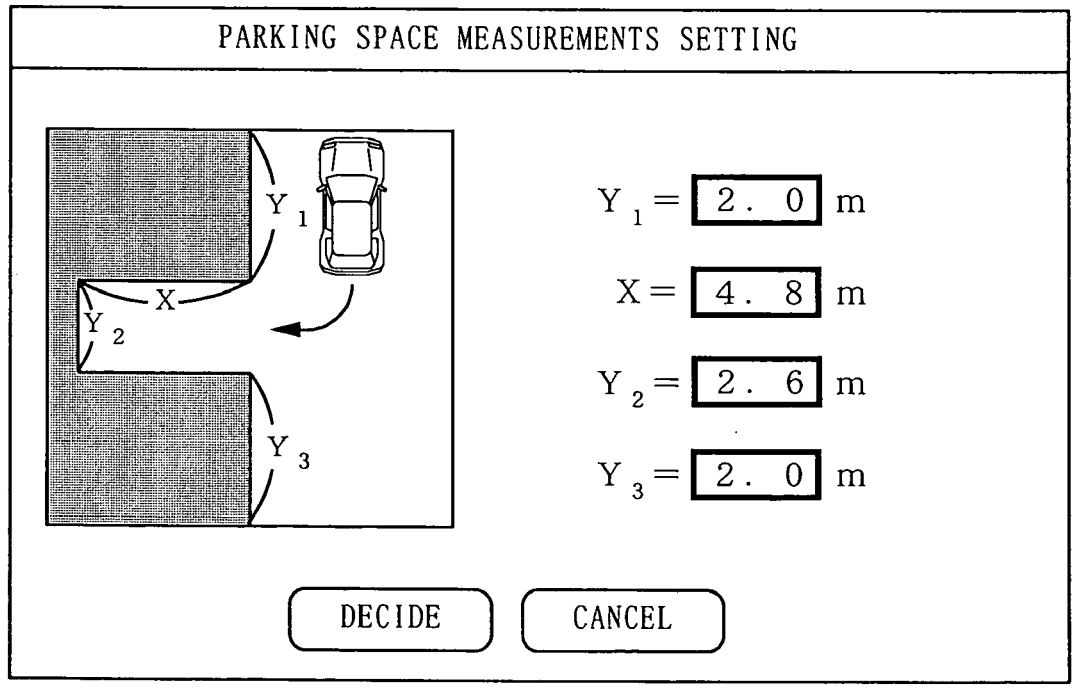
Figure 25A:
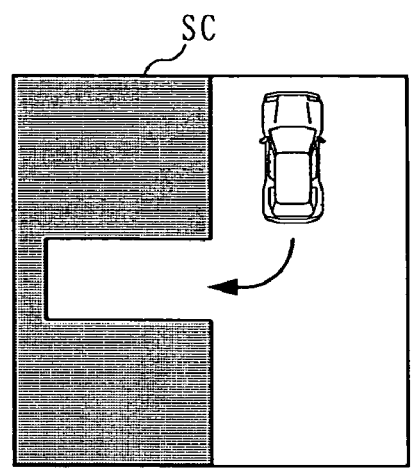
FIGS. 25A to 25H are schematic diagrams illustrating exemplary parking space types selected when inputting shape data in the fifth embodiment of the present invention.
Figure 25B:
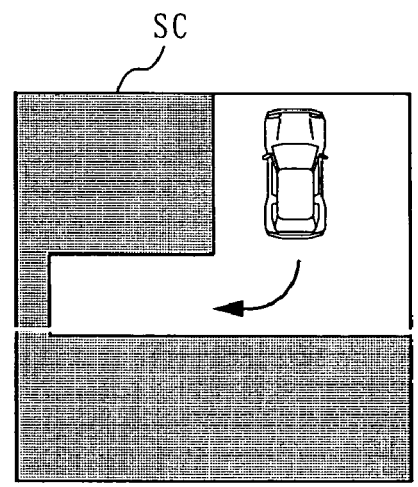
Figure 25C:
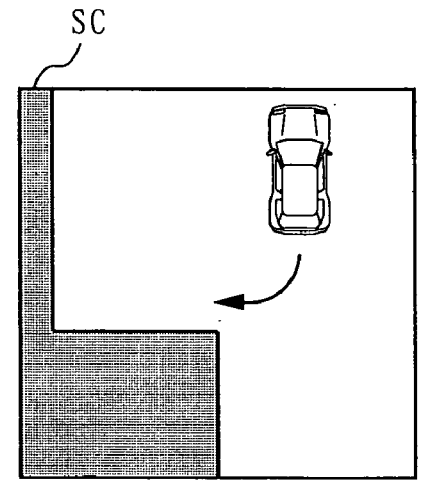
Figure 25D:
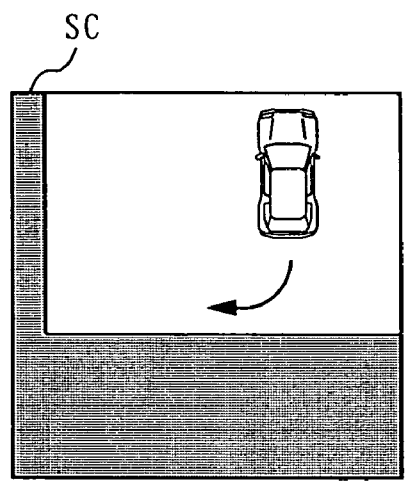
Figure 25E:
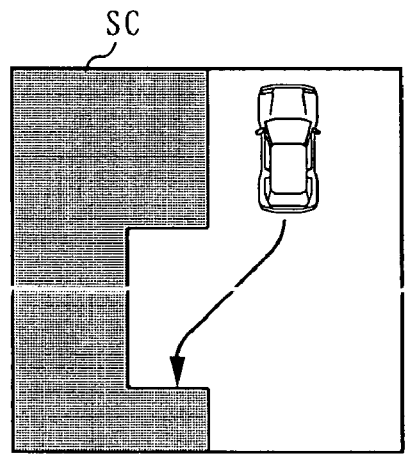
Figure 25F:
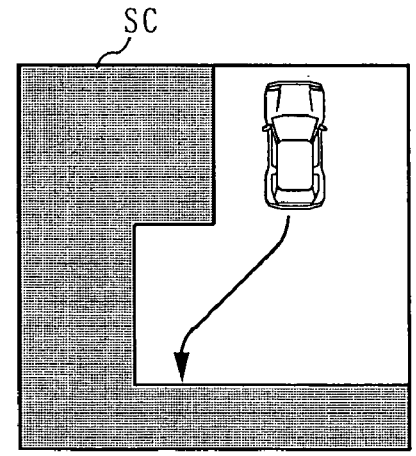
Figure 25G:
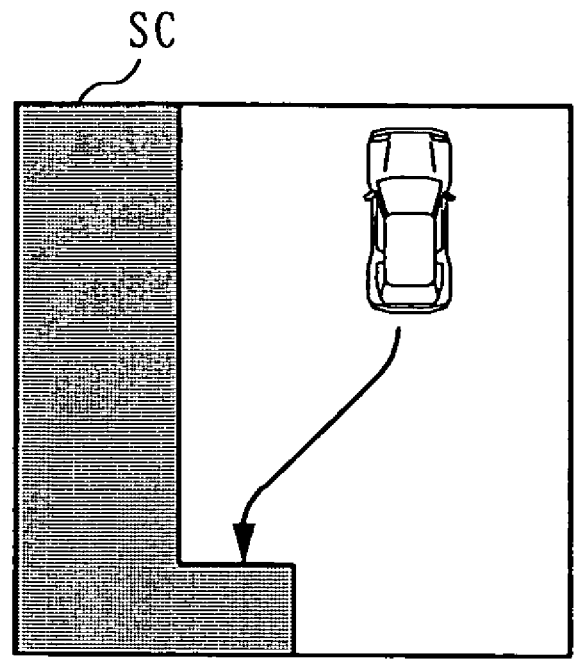
Figure 25H:
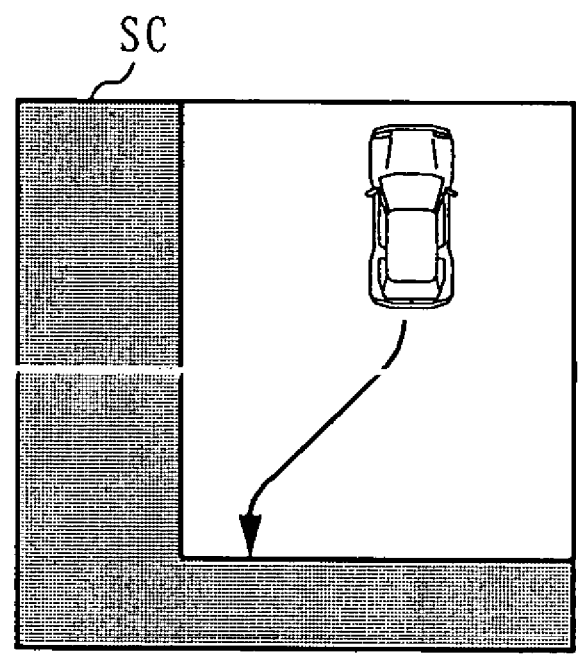

Next, the control section 13 accepts the measurements of the obstacle surrounding the parking space inputted via the input section 16 by the operation of the driver (step S703). Specifically, the control section 13 displays a screen for setting the measurements of the parking space, the screen corresponding to the parking space type selected at step S702, and accepts the measurements of the obstacle inputted via the input section 16 operated by the driver. Here, FIG. 24B illustrates a parking space measurement setting screen. In the parking space measurement setting screen shown in FIG. 24B, the measurements of four portions, i.e., $Y_1$, X, $Y_2$, and $Y_3$, are inputted.

Next, the control section 13 calculates the coordinates of points A (hereinafter referred to as "shape points") which are located at intervals of 10 cm along the shape of the obstacle, based on the measurements of the parking space inputted at step S703 (step S704). Among the successively-adjoining shape points, the control section 13 further calculates vectors a (hereinafter referred to as "shape vectors") whose origin and end point are, respectively, one shape point and the next shape point, starting with the shape point at the right end as seen from the vehicle (step S705).

Figure 26:
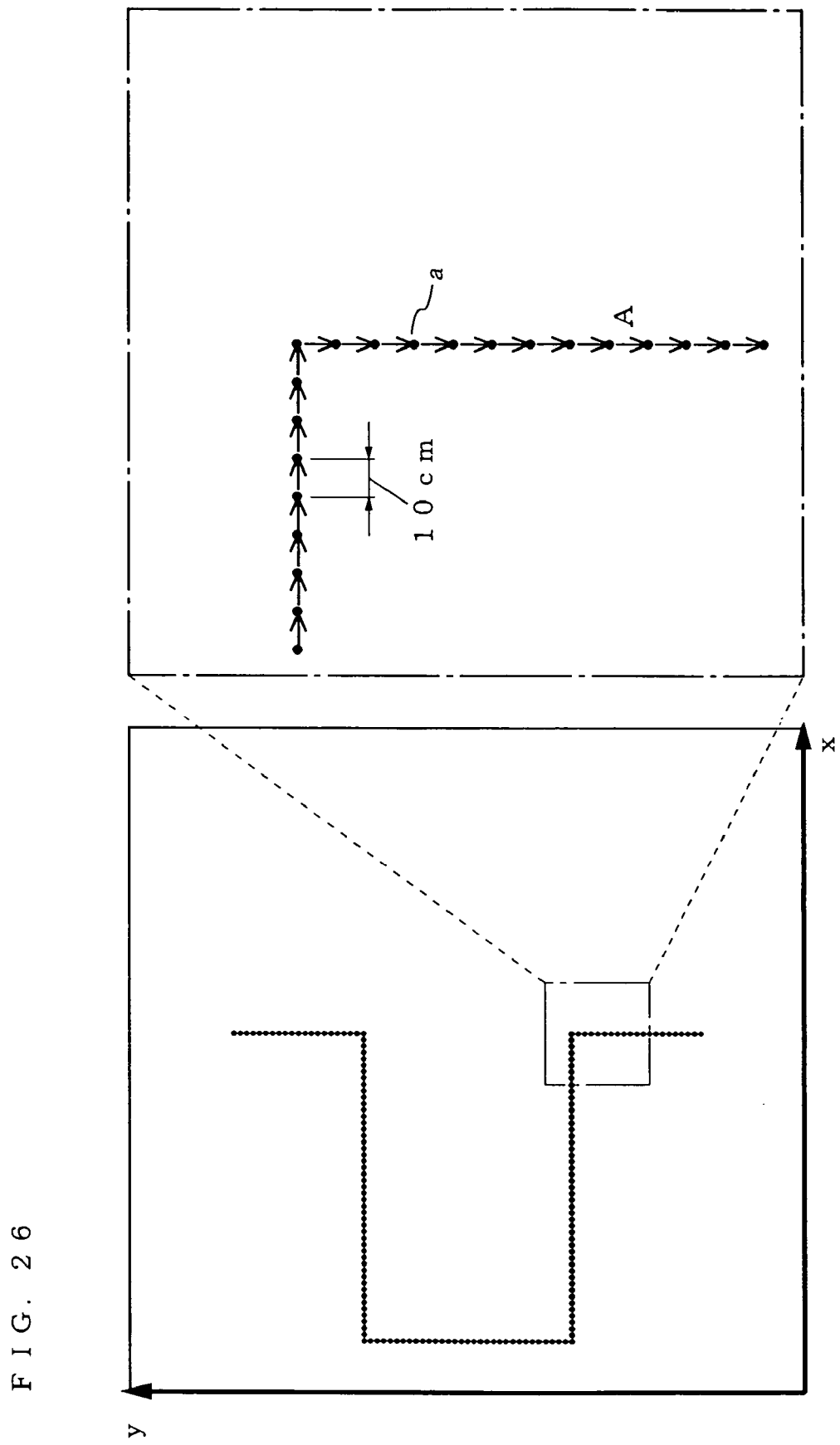
FIG. 26 is a diagram illustrating shape points and shape vectors stored as shape data in the fifth embodiment of the present invention.

Here, FIG. 26 is a diagram showing shape points A and shape vectors a which are calculated at step S704 and step S705. In the left side of FIG. 26, a line of shape points A representing substantially the entire obstacle is shown, whereas in the right side of FIG. 26, an enlarged view of the inside of the frame in a dot-dash line is shown. In addition, in the right side of FIG. 26, the shape points A and the shape vectors a are shown. Each point shown in FIG. 26 represents a shape point A, which is calculated based on the measurements of the parking space as entered as shown in FIG. 24B. Each arrow shown in FIG. 26 represents a shape vector a.

The shape data storage section 17 stores, as a unit of shape data, the combination of the shape data number, the shape data name, the parking space type, which have been inputted as described above, and the shape points A and shape vectors a as calculated (step S706).

Note that the above-described operation of the obstacle detection device when registering shape data is merely an exemplary method for registering shape data, and the method for registering shape data is not restricted to this.

Figure 27:
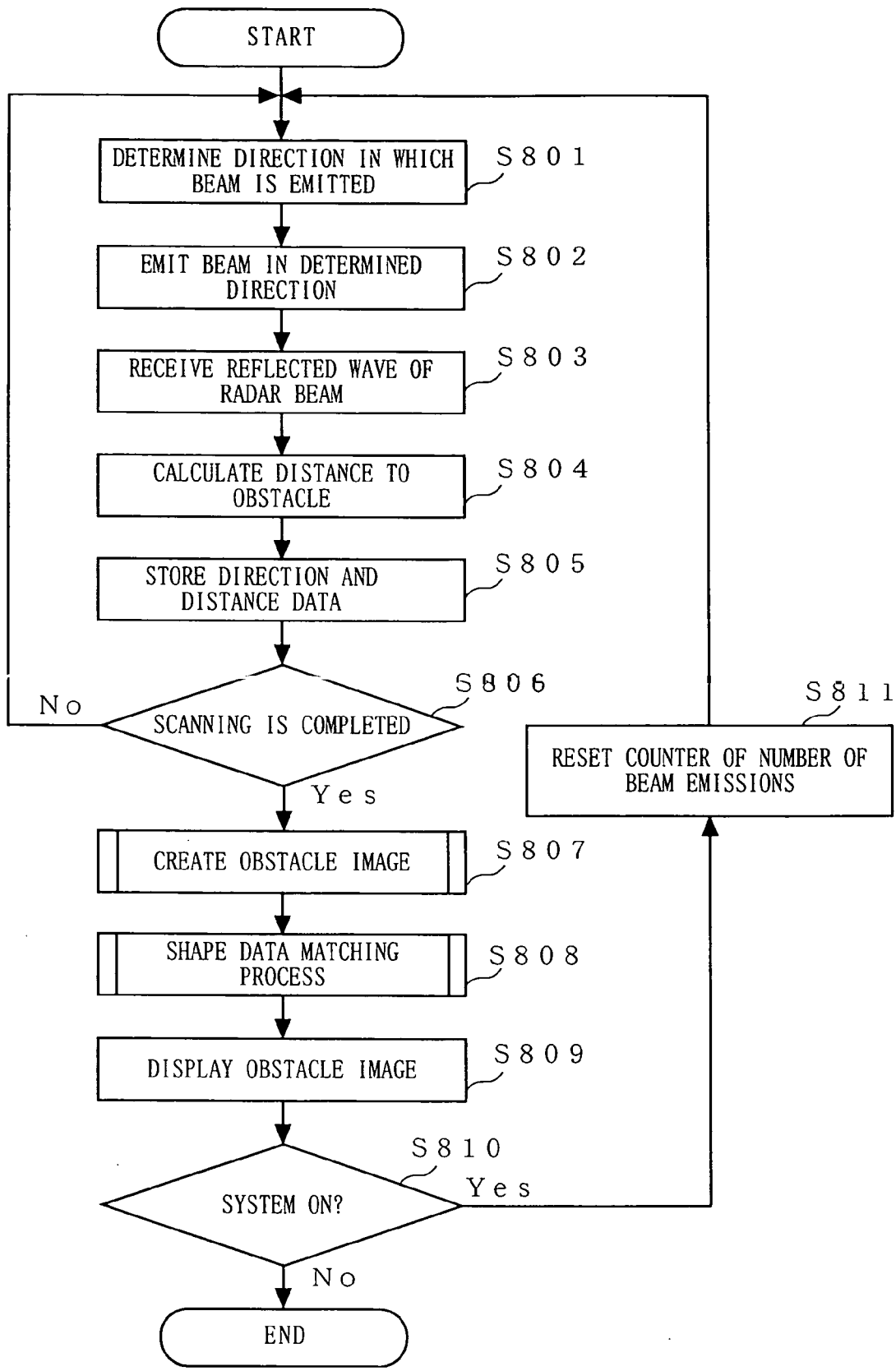
FIG. 27 is a flowchart illustrating an operation of the obstacle detection device according to the fifth embodiment of the present invention.

Next, an operation of the obstacle detection device when displaying the positional relationship between the shape of the entire obstacle to be detected and the vehicle based on the shape data registered in the above-described manner and the data of the obstacle detected by the obstacle detection section 11 is described. FIG. 27 is a flowchart showing the operation of the obstacle detection device when displaying the location and shape of the obstacle in relation to the vehicle by using the direction and distance data of the detected obstacle and the shape data stored in the shape data storage section 17. The flowchart shown in FIG. 27 is identical to the flowchart according to the first embodiment (see FIG. 3) except that step S108 is replaced by step S808. Therefore, the description of the processes identical to those in the first embodiment is omitted. At step S808, the control section 13 creates an image in which the shape of the obstacle previously registered is superposed on the obstacle image so as to coincide best with the shape of the detected obstacle, by adjusting the direction and location thereof.

Figure 28:
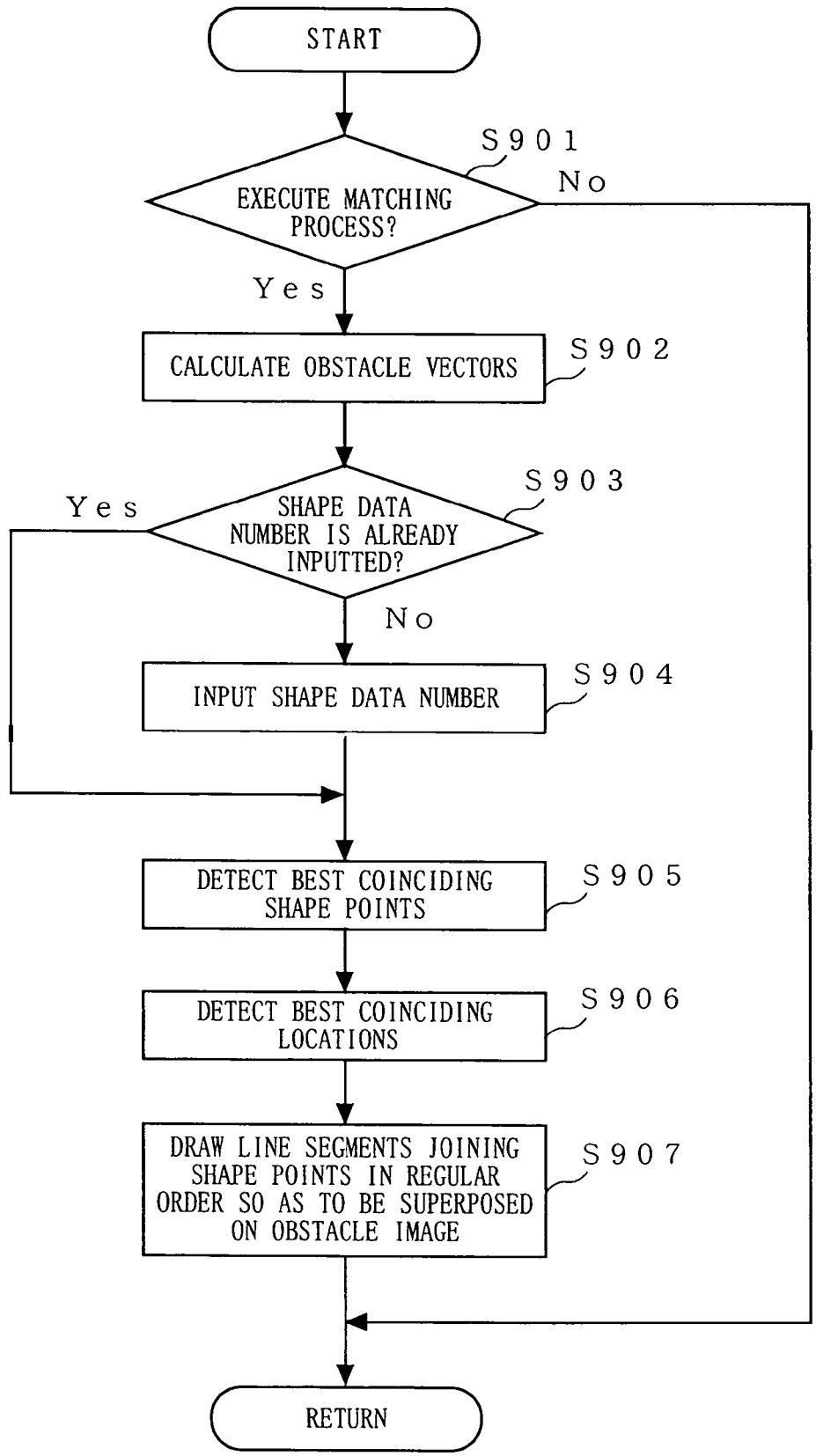
FIG. 28 is a flowchart illustrating an operation of subroutine step S707 in FIG. 27 in the fourth embodiment of the present invention.

FIG. 28 is a flowchart showing a subroutine process of step S808 shown in FIG. 27. The control section 13 determines whether to superpose the registered shape data on the obstacle image created at step S807, by receiving a signal from the input section 16 as a result of an operation of the driver (step S901). If the above determination is No, the process returns to the main routine shown in FIG. 27. On the other hand, if the above determination is Yes, the process proceeds to step S902.

At step S902, the shape data matching section 18 calculates, based on the direction data and the distance data stored in the control section 13, the coordinates of obstacle detection points P and interpolated points P' which are interpolated between two obstacle detection points P at a predetermined interval, and obtains obstacle vectors b for showing the shape of the detected obstacle, based on the coordinates of the calculated obstacle detection points P and the interpolated points P' (step S902 ).

Figure 29:
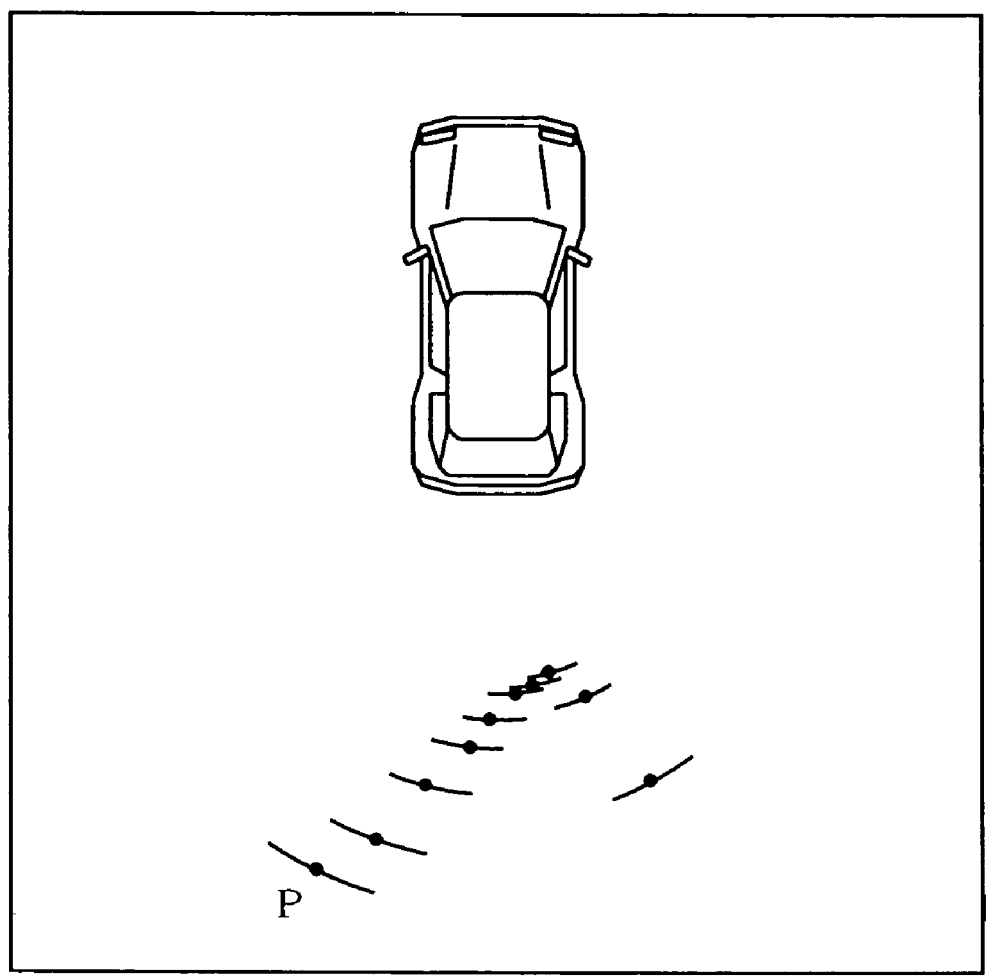
FIG. 29 is a diagram illustrating obstacle detection points in the fifth embodiment of the present invention.
Figure 30:
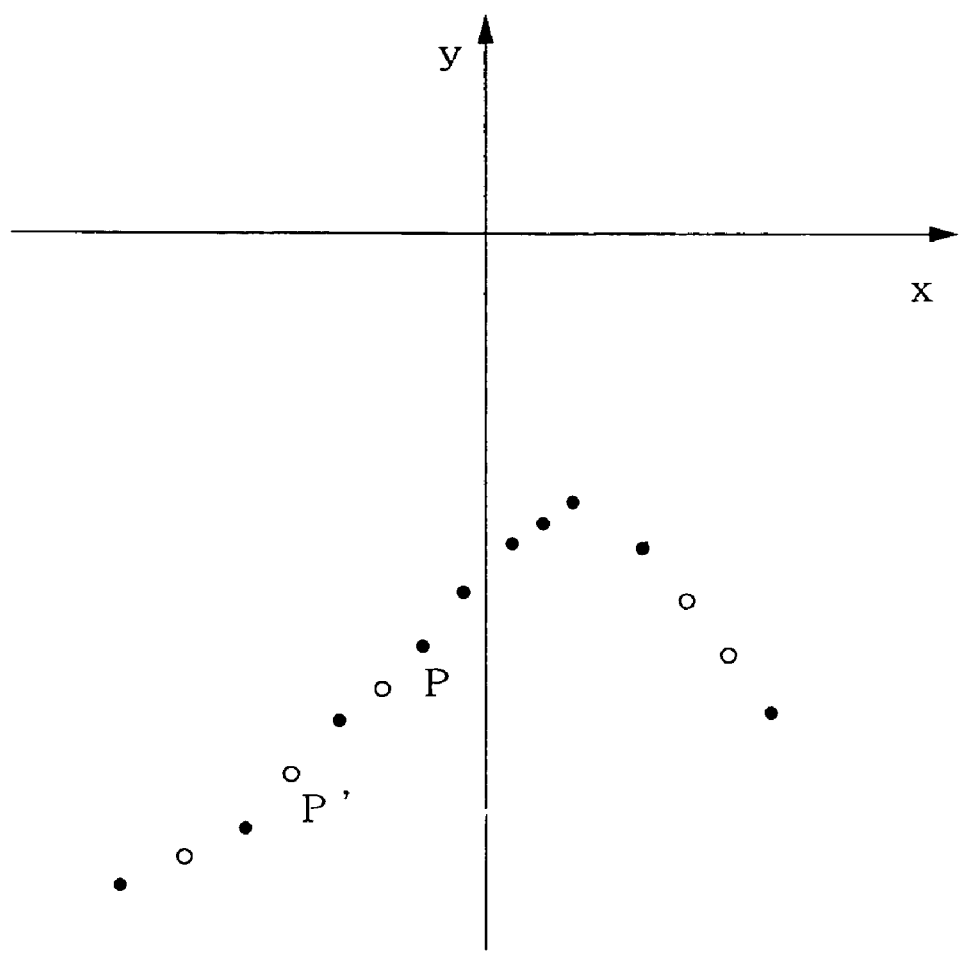
FIG. 30 is a schematic diagram illustrating obstacle detection points and interpolated points in the fifth embodiment of the present invention.

Next, with reference to FIG. 29 and FIG. 30, an operation at step S902 of the shape data matching section 18 is described more specifically. In FIG. 29, at least one obstacle detection point P in an obstacle image is shown. In FIG. 30, in a coordinate system with the antenna of the vehicle for the origin thereof, several obstacle detection points P are shown in black as in the obstacle image, and in addition, several interpolated points P' are shown in white. The interpolated points P' are one or more points interpolated between two obstacle detection points P which are apart by an interval longer than a predetermined length, and the coordinates thereof are determined so that the obstacle detection points P and the interpolated points P' are evenly spaced and that the length of the interval is as close to the interval between shape points (which is 10 cm in the present embodiment) as possible. For example, the control section 13 determines a natural number n by which a distance between two neighboring obstacle detection points P is equally divided such that the resulting distance becomes as close to 10 cm as possible. Thereafter, the control section 13 determines, as the number of interpolated points P' to be created between the two obstacle detection points P, a number that is obtained by subtracting one from the thus determined natural number n.

Based on the coordinates of the obstacle detection points P and the interpolated points P', the shape data matching section 18 calculates, among the obstacle detection points P and interpolated points P' which are arranged in sequence, vectors (hereinafter referred to as "obstacle vectors") b whose origin and end point are, respectively, a point and the next point, starting with the point at the right end as seen from the vehicle.

Next, the shape data matching section 18 determines whether a shape data number for performing a matching with the location of the detected obstacle has been inputted (step S903). If the determination at step S903 is Yes, the process proceeds to step S905. On the other hand, if the determination at step S903 is No, the process proceeds to step S904, and the shape data matching section 18 accepts, from the input section 16 operated by the driver, the shape data number for performing a matching (step S904).

At step S905, the control section 13 reads from the shape data storage section 17 shape data identified by the shape data number received at step S904, and detects, while changing the directions of shape vectors, some of the shape vectors and directions which best coincide with the obstacle vectors calculated at step S902 (step S905).

Figure 31A:
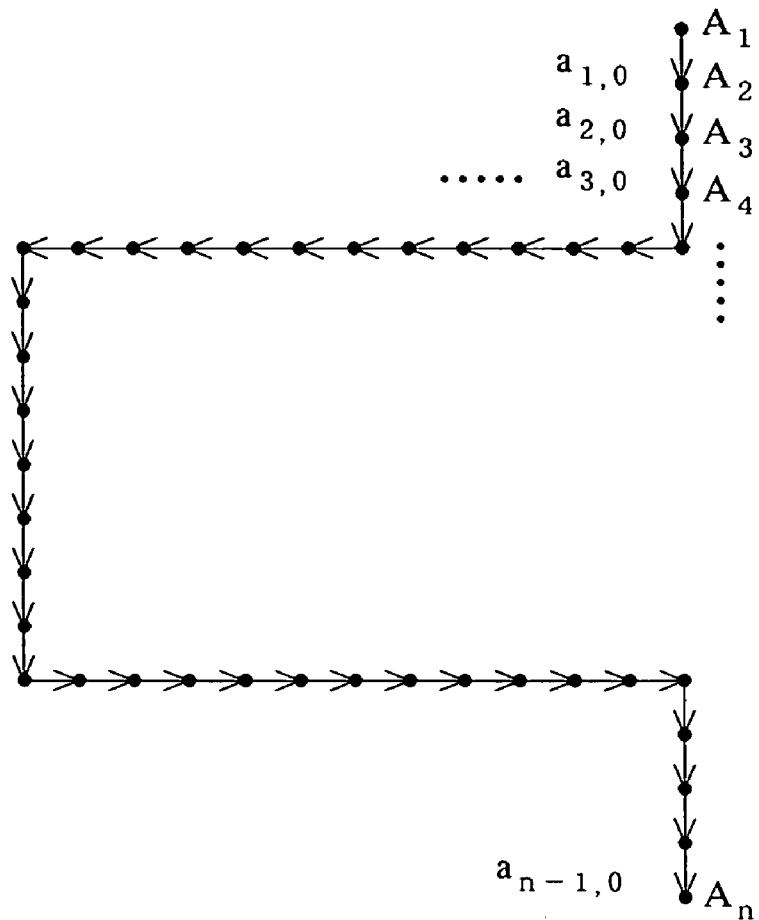
FIGS. 31A and 31B are schematic diagrams illustrating exemplary shape vectors and obstacle vectors in the fifth embodiment of the present invention.
Figure 31B:
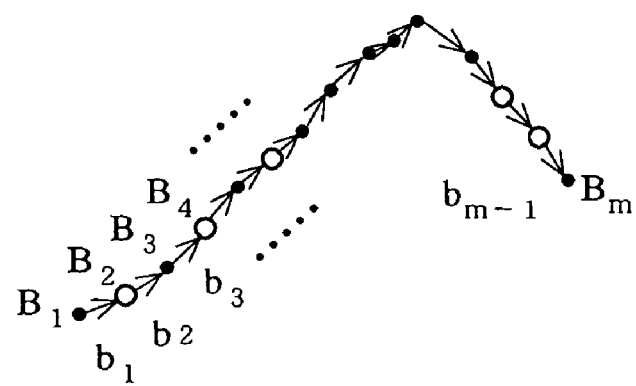
Figure 32A:
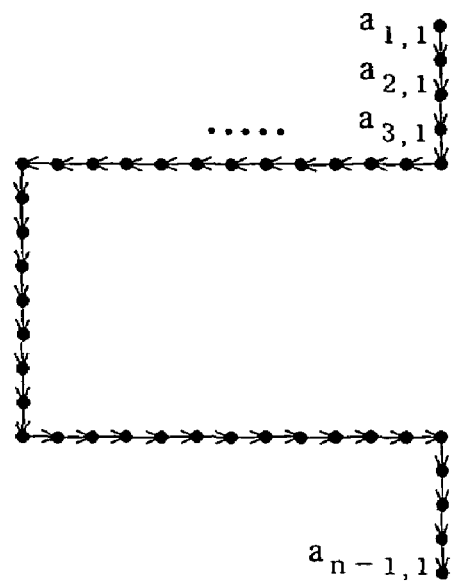
FIGS. 32A to 32D are schematic diagrams illustrating exemplary shape vectors being caused to rotate in the fifth embodiment of the present invention.
Figure 32B:
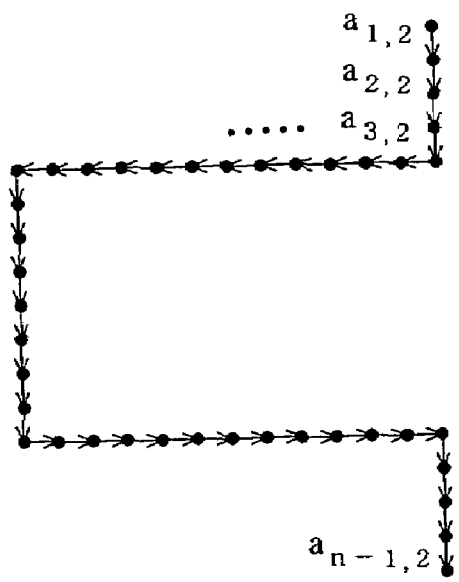
Figure 32C:
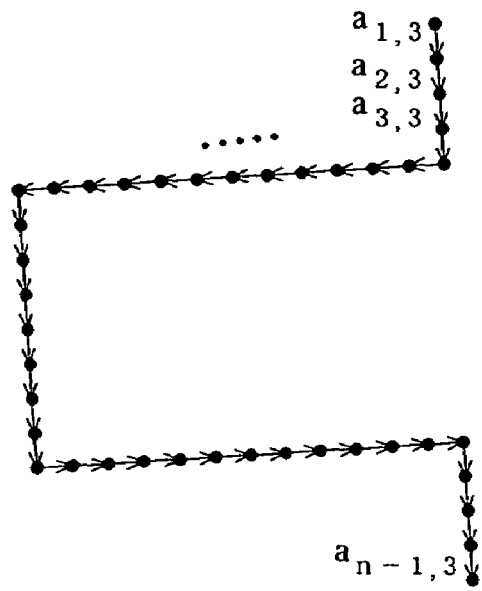
Figure 32D:
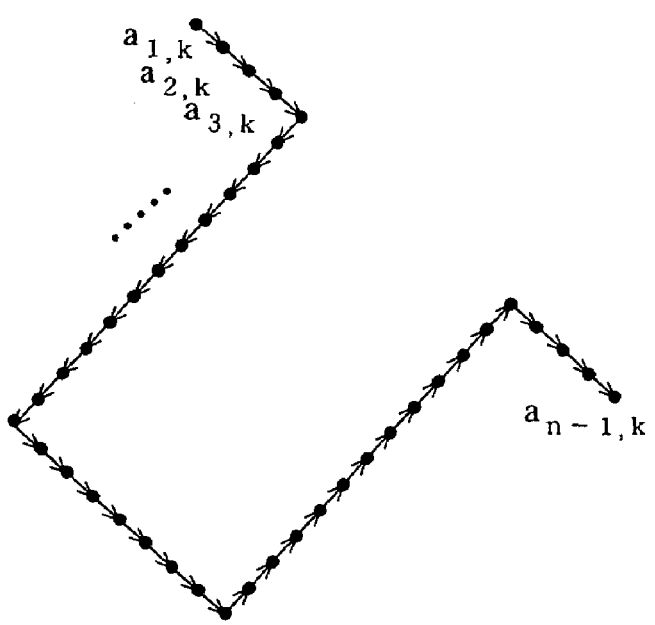

Next, with reference to FIGS. 31A and 31B, FIGS. 32A to 32D, and FIG. 33, an operation at step S905 of the shape data matching section 18 is described more specifically. Note that each of these figures is a schematic diagram for explaining the operation at step S905 of the shape data matching section 18, and therefore intervals between shape points A, between obstacle detection points P, and between interpolated points P' shown in the figure are made wider than they actually are. In FIG. 31A, shape points A and shape vectors a which have been read from the shape data storage section 17 are shown. The points $A_1$, $A_2$, $A_3$, $A_4$, ... $A_n$ shown in FIG. 31A are examples of the shape points A, and $a_{1,0}$, $a_{2,0}$, $a_{3,0}$, ... $a_{n-1,0}$ are examples of the shape vectors a. In FIG. 31B, obstacle detection points P, interpolated points P', and obstacle vectors b are shown. Points $B_1$, $B_2$, $B_3$, $B_4$, ... $B_n$ shown in FIG. 31B are obstacle detection points P and interpolated points P'; and $b_1$, $b_2$, $b_3$ ... $b_{m-1}$ are examples of the obstacle vectors b.

The shape data matching section 18 selects (m−1) successive shape vectors a from the whole shape vectors a, the number (m−1) being equal to that of the obstacle vectors b. Pairing the (m−1) obstacle vectors b with the (m−1) shape vectors a in regular order, the shape data matching section 18 calculates the sum total of the inner products of the paired vectors b and a as a direction coincidence degree. For example, the direction coincidence degree of the shape vectors, $a_{1,0}$, $a_{2,0}$, $a_{3,0}$, ... $a_{m-1,0}$, and the obstacle vectors, $b_1$, $b_2$, $b_3$ ... $b_{m-1}$, is expressed as "$a_{1,0} \cdot b_1 + a_{2,0} \cdot b_2 + a_{3,0} \cdot b_3 + \ldots a_{m-1,0} \cdot b_{m-1}$."

While consecutively shifting the m−1 successive shape vectors selected from the whole shape vectors by one, the shape data matching section 18 calculates a direction coincidence degree for each instance.

Further, the shape data matching section 18 calculates the direction coincidence degree in the same manner with respect to shape vectors, $a_{1,k}$, $a_{2,k}$, $a_{3,k}$ ... $a_{n-1,k}$ (k is a degree of rotation), obtained by rotating the shape vectors, $a_{1,0}$, $a_{2,0}$, $a_{3,0}$ ... $a_{m-1,0}$, by about 1° one after another in the counterclockwise direction. In FIGS. 32A to 32D, shape vectors a when rotated by the angle of about 1°, about 2°, about 3°, and about k°, respectively, are shown. Direction coincidence degrees M as calculated in the above-described manner are expressed as the following formula (7).

$$M = \sum_{j=1}^{m-1} a_{j+i,k} \cdot b_j \quad (i = 0, 1, \ldots, n-m-1, k = 0, 1, 2, \ldots) \tag{7}$$

Note that the value of the rotation angle k of the shape vectors a when calculating the direction coincidence degrees M may be restricted to a predetermined range corresponding to the parking space type of the read shape data. For example, in the case of the parking space type shown in FIG. 24B, if the inclination of the parking space relative to the vehicle is about 0° when the entry into the parking space is begun, it has rotated by 90° in the counterclockwise direction as seen from above the vehicle when the parking is completed. In other words, in the case of this parking space type, it is ideal that the value of the rotation angle k or the shape vectors changes within the range between 0° and 90°. In practice, however, in view of possible occurrence of wobbling of the vehicle and driving operations such as retrial of steering, it is preferable that the range the rotation angle k can cover is restricted to a range slightly wider than the range from 0° to 90°.

Figure 33:
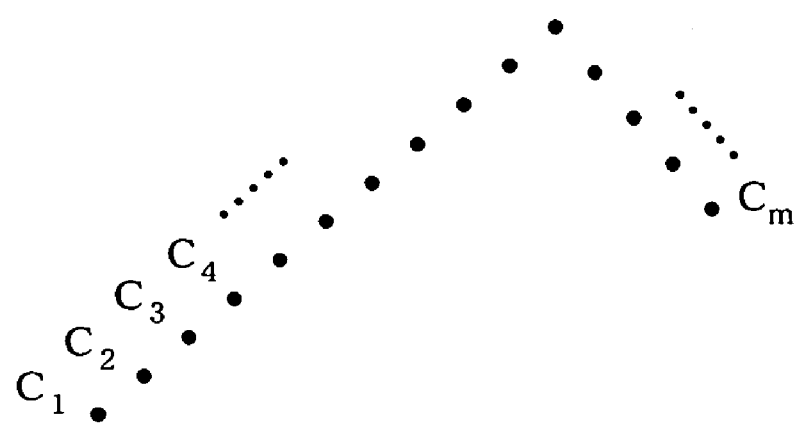
FIG. 33 is a diagram illustrating exemplary best coinciding shape points detected in the fifth embodiment of the present invention.

The shape data matching section 18 identifies (m−1) shape vectors, $a_{i,k}$, $a_{i+1,k}$, ... $a_{i+m-2,k}$, which produces the highest direction coincidence degree M among all of the direction coincidence degrees M calculated in the above-described manner, and detects a shape point $A_i$ corresponding to the start point of these shape vectors a and the angle k. The shape data matching section 18 sequentially extracts m shape points, starting with the thus-detected shape point $A_i$. The m shape points as rotated around the shape point $A_i$ by the angle k (hereinafter referred to as "best coinciding shape points" Q) are the shape points A that best coincide with the obstacle detection points P. The points, $C_1$, $C_2$, $C_3$, $C_4$, ... $C_m$, shown in FIG. 33 are the best coinciding shape points Q thus detected.

Next, the shape data matching section 18 detects coordinates on the obstacle image at which the best coinciding shape points Q detected at step S905 best coincide with the obstacle detection points P (step S906). An operation at step S906 of the shape data matching section 18 is described more specifically. First, the shape data matching section 18 shifts the coordinates of all best coinciding shape points Q so that the coordinates of the obstacle detection point $B_1$ and the coordinates of the shape point $C_1$ coincide with each other; pairs the obstacle detection points P and interpolated points P' with the best coinciding shape points Q in regular order; and calculates a reciprocal (hereinafter referred to as a "location coincidence degree R") of the sum total of distances between two points that are paired.

Further, the shape data matching section 18 shifts the coordinates of the best coinciding shape points Q by 10 cm one after another in the x axis direction and y axis direction ten times each, and calculates the location coincidence degree R with respect to the coordinates of each set of the shifted best coinciding shape points Q. For example, if the coordinates of the whole best coinciding shape points Q are shifted in the longitudinal and horizontal directions ten times each, a hundred location coincidence degrees R are calculated. The location coincidence degrees R which are calculated while shifting the locations of the best coinciding shape points Q in the above-described manner are calculated according to the following formula.

$$R = 1 \Big/ \sum_{j=1}^{m} D(A_{j,l}, B_j) \quad (l = 1, 2, \ldots, L) \tag{8}$$

The shape data matching section 18 detects the coordinates ($x_Q$, $y_Q$) of the shape point $C_1$ when the location coincidence degrees R thus calculated give a maximum value.

Figure 34:
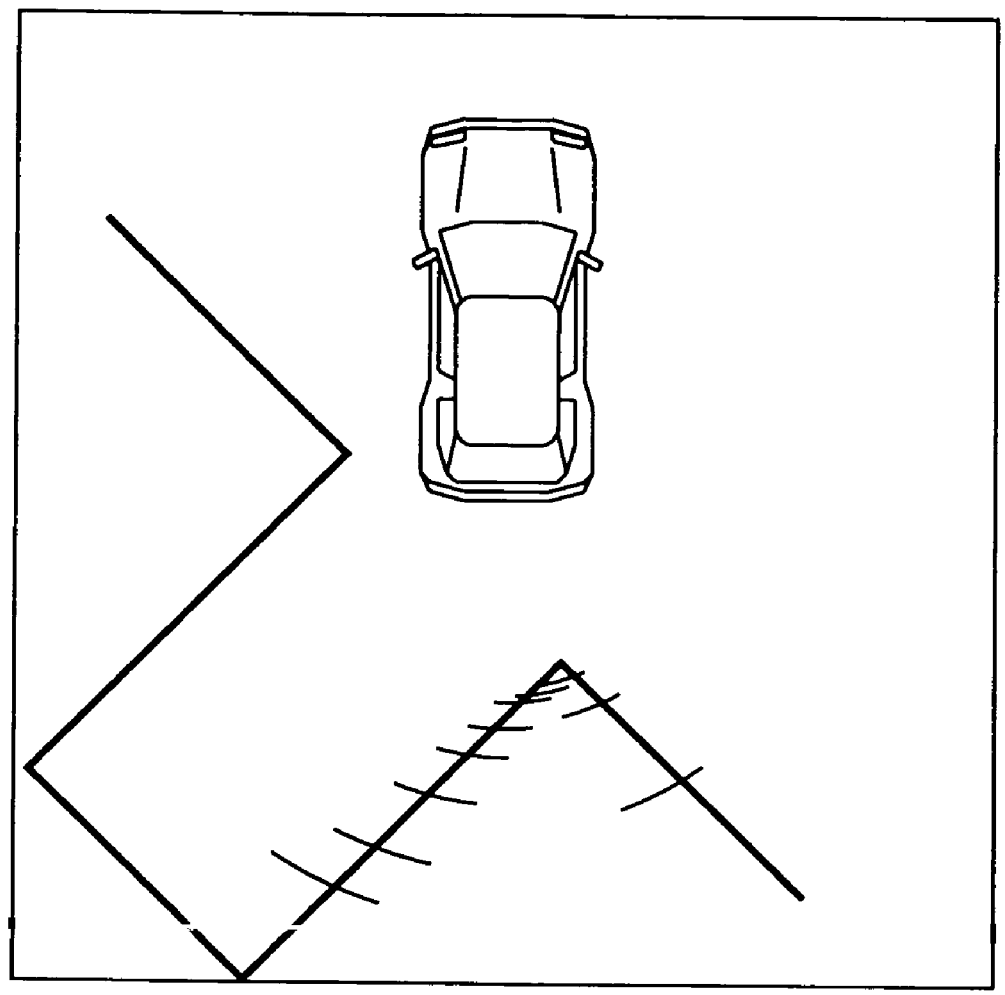
FIG. 34 is a diagram illustrating an exemplary obstacle image displayed on the display section in the fifth embodiment of the present invention.

Next, the obstacle image creation section 14 calculates coordinates obtained by rotating all of the read shape points on the point $A_i$ by only the angle k° and then moving them so that the coordinates of the point $A_i$ coincide with the coordinates ($x_Q$, $y_Q$) calculated at step S906, and draws line segments joining the thus calculated coordinates of the shape points in regular order so as to be superposed on the obstacle image (step S907). After step S907, the process returns to the main routine. The obstacle image drawn as above is shown in FIG. 34. It is apparent from FIG. 34 that the obstacle detection device according to the present embodiment displays the shape of an obstacle previously registered so as to coincide with the location of the detected obstacle, and the shape of the obstacle in its entirety including a detection range is displayed so as to be easily grasped.

As described below, the present obstacle detection device previously stores the shape of an obstacle, and when detecting the obstacle, displays the previously registered shape of the obstacle so as to be superposed at a position best coinciding with the detected obstacle. This makes it possible to display not only the accurate location and shape of the obstacle in relation to the vehicle but also the shape of the obstacle being outside the detection range, thereby making it easier for the driver to grasp the shape of the obstacle in the vicinity of the vehicle.

Note that it has been assumed in the present embodiment that a target obstacle image representing the shape of an obstacle to be detected is displayed so as to be superposed on the obstacle image according to the first embodiment. Instead, it may be displayed so as to be superposed on the obstacle image according to any of the above-described second to fourth embodiments.

Also, it has been assumed in the present embodiment that when registering the shape of an obstacle, both of the shape points and the shape vectors are stored in the shape data storage section 17. Alternatively, only the shape points may be stored in the shape data storage section 17, whereas the shape vectors are calculated from the shape points read from the shape data storage section 17 in the process of step S904 in FIG. 28.

Also, it has been assumed in the present embodiment that the interval between the shape points representing the shape of the registered obstacle is 10 cm. However, the interval of the shape points may be longer or shorter than 10 cm. As the interval between the shape points becomes shorter, matching process can be performed more accurately although calculation load on the shape data matching section 18 becomes increased. Also, it is necessary that the interval between the interpolated points interpolated between the obstacle detection points be determined so as to be as closer to the interval of the shape points as possible in accordance with the interval of the shape points.

Also, the obstacle detection device according to the first to fifth embodiments of the present invention is capable of displaying the location of an obstacle existing in the vicinity of the vehicle so as to be easily grasped even in the case where a radio-wave radar or the like that emits beams having a relatively wide irradiation range is used. However, a rader, such as a laser radar, that emits linear beams may be used.

Also, it may be so arranged that the obstacle images according to the first to fifth embodiments of the present invention can be prepared by a single obstacle detection device, and either one of the obstacle images according to the first to fifth embodiments is displayed based on a signal from the input section 16 operated by the driver.

While the invention has been described in detail, the foregoing description is in all aspects illustrative and not restrictive. It is understood that numerous other modifications and variations can be devised without departing from the scope of the invention.

INDUSTRIAL APPLICABILITY

An obstacle detection device according to the present invention is effectively applied to a driving aid device and the like which requires a technique which makes it easy for the driver to intuitively grasp the positional relationship between a vehicle and an obstacle.

The invention claimed is:

1. An obstacle detection device to be mounted on a vehicle for detecting and displaying an obstacle in a vicinity of the vehicle, the device comprising:
   an obstacle detection section for emitting beams having a predetermined divergence angle consecutively in a plurality of different directions, and for each direction, receiving a reflected wave from an obstacle and detecting the obstacle existing within an emission angle range of the beam for the direction;
   a distance calculation section for calculating, for each direction, a distance representative of an interspace between the obstacle and the vehicle based on a received signal of the reflected wave;
   an obstacle image creation section for creating, for each direction, an obstacle image as a figure two-dimensionally developed in the emission angle range of the corresponding beam while treating, as a basis for image creation, the distance calculated by the distance calculation section for the direction, and for creating and outputting image data for displaying the obstacle image; and
   a display section for receiving the image data created by the obstacle image creation section and displaying an image showing a positional relationship between the obstacle and the vehicle,
   wherein, for each direction, the obstacle image created by the obstacle image creation section is an arc figure whose center is an emission point of the beams and whose radius is the distance calculated by the distance calculation section for the direction, and
   wherein, for each direction, the obstacle image creation section changes a thickness of the arc figure as the obstacle image, in accordance with the distance calculated by the distance calculation section for the direction.

2. An obstacle detection device to be mounted on a vehicle for detecting and displaying an obstacle in a vicinity of the vehicle, the device comprising:
   an obstacle detection section for emitting beams having a predetermined divergence angle consecutively in a plurality of different directions, and for each direction, receiving a reflected wave from an obstacle and detecting the obstacle existing within an emission angle range of the beam for the direction;
   a distance calculation section for calculating, for each direction, a distance representative of an interspace between the obstacle and the vehicle based on a received signal of the reflected wave;
   an obstacle image creation section for creating, for each direction, an obstacle image as a figure two-dimensionally developed in the emission angle range of the corresponding beam while treating, as a basis for image creation, the distance calculated by the distance calculation section for the direction, and for creating and outputting image data for displaying the obstacle image; and
   a display section for receiving the image data created by the obstacle image creation section and displaying an image showing a positional relationship between the obstacle and the vehicle,
   wherein, for each direction, the obstacle image created by the obstacle image creation section is a figure having an area and at least containing an arc figure whose center is an emission point of the beams and whose radius is the distance calculated by the distance calculation section for the direction, and
   wherein, for each direction, the obstacle image created by the obstacle image creation section is an elliptical figure, end points of whose major axis coincide with end points of the arc locus.

3. An obstacle detection device to be mounted on a vehicle for detecting and displaying an obstacle in a vicinity of the vehicle, the device comprising:

an obstacle detection section for emitting beams having a predetermined divergence angle consecutively in a plurality of different directions, and for each direction, receiving a reflected wave from an obstacle and detecting the obstacle existing within an emission angle range of the beam for the direction;

a distance calculation section for calculating, for each direction, a distance representative of an interspace between the obstacle and the vehicle based on a received signal of the reflected wave;

an obstacle image creation section for creating, for each direction, an obstacle image as a figure two-dimensionally developed in the emission angle range of the corresponding beam while treating, as a basis for image creation, the distance calculated by the distance calculation section for the direction, and for creating and outputting image data for displaying the obstacle image; and a display section for receiving the image data created by the obstacle image creation section and displaying an image showing a positional relationship between the obstacle and the vehicle;

wherein, for each direction, the obstacle image created by the obstacle image creation section is a figure having an area and at least containing an arc figure whose center is an emission point of the beams and whose radius is the distance calculated by the distance calculation section for the direction;

wherein, while treating as a base figure the figure having an area created for each direction, the obstacle image creation section further determines as the obstacle image an entire figure obtained by joining all base figures in order of direction with line segments joining end points on one side of the arc loci contained in the base figures and with line segments joining end points on the other side of the arc loci contained in the base figures; and wherein an inside of the entire figure is divided into parts based on a distance from the emission point of the beams, and the image data is created such that adjacent parts obtained by the division have a gradual difference in brightness.

4. An obstacle detection device to be mounted on a vehicle for detecting and displaying an obstacle in a vicinity of the vehicle, the device comprising:

an obstacle detection section for emitting beams having a predetermined divergence angle consecutively in a plurality of different directions, and for each direction, receiving a reflected wave from an obstacle and detecting the obstacle existing within an emission angle range of the beam for the direction;

a distance calculation section for calculating, for each direction, a distance representative of an interspace between the obstacle and the vehicle based on a received signal of the reflected wave;

an obstacle image creation section for creating, for each direction, an obstacle image as a figure two-dimensionally developed in the emission angle range of the corresponding beam while treating, as a basis for image creation, the distance calculated by the distance calculation section for the direction, and for creating and outputting image data for displaying the obstacle image; and a display section for receiving the image data created by the obstacle image creation section and displaying an image showing a positional relationship between the obstacle and the vehicle, wherein, for each direction, the obstacle image created by the obstacle image creation section is an arc figure whose center is an emission point of the beams and whose radius is the distance calculated by the distance calculation section for the direction, wherein, for each direction, the obstacle image creation section further treats, as a representative location of the obstacle, a point apart from the emission point of the beams by the distance calculated by the distance calculation section for the direction, the point being in a central direction of the emission angle range of the beam emitted in the direction, and wherein the obstacle image creation section further creates image data of a kinked line joining the representative locations in order of direction.

* * * * *